US008135410B2

(12) United States Patent
Forte

(10) Patent No.: US 8,135,410 B2
(45) Date of Patent: *Mar. 13, 2012

(54) METHOD AND APPARATUS FOR COMMUNICATING WITH ONE OF PLURAL DEVICES ASSOCIATED WITH A SINGLE TELEPHONE NUMBER DURING A DISASTER AND DISASTER RECOVERY

(75) Inventor: Stephen P. Forte, Calabasas, CA (US)

(73) Assignee: Ascendent Telecommunications, Inc. CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/748,679

(22) Filed: May 15, 2007

(65) Prior Publication Data
US 2007/0217437 A1    Sep. 20, 2007

Related U.S. Application Data

(60) Division of application No. 10/440,090, filed on May 19, 2003, now Pat. No. 7,292,858, which is a continuation-in-part of application No. 09/593,543, filed on Jun. 14, 2000, now Pat. No. 7,305,079.

(60) Provisional application No. 60/139,498, filed on Jun. 14, 1999, provisional application No. 60/185,070, filed on Feb. 25, 2000.

(51) Int. Cl.
*H04W 4/00* (2009.01)
(52) U.S. Cl. .................. 455/445; 379/211.01; 370/329; 370/352; 370/401

(58) Field of Classification Search .................. 370/401, 370/352, 329; 455/445; 379/211.01
See application file for complete search history.

(56) References Cited

U.S. PATENT DOCUMENTS

| 4,471,167 A | 9/1984 | Cripps |
| 4,481,382 A | 11/1984 | Villa-Real |
| 4,661,970 A | 4/1987 | Akaiwa |
| 4,661,974 A | 4/1987 | Bales et al. |
| 4,674,115 A | 6/1987 | Kaleita et al. |
| 4,829,554 A | 5/1989 | Barnes et al. |

(Continued)

FOREIGN PATENT DOCUMENTS
EP    0588646    3/1994

OTHER PUBLICATIONS

European Patent Office, Extended European Search Report for Application No. 08164433.8, Jul. 28, 2010.

*Primary Examiner* — Pierre-Louis Desir
(74) *Attorney, Agent, or Firm* — Norton Rose Canada LLP

(57) ABSTRACT

A system for (and a method of) selectively establishing communication with one of plural devices associated with a single telephone number during a disaster or disaster recovery period. The method can offer disaster recovery to an enterprise depending upon its size, financial well-being and desired capabilities. For example, the enterprise has the option of owning or renting all of the equipment required so that it may perform disaster recovery on its own and with little outside intervention. The enterprise may own some or none of the necessary equipment and contract with a service bureau so that the bureau provides recovery equipment when needed. The system also provides for roll call, priority preemption and seamless switching services to and from circuit and packet communication devices.

14 Claims, 15 Drawing Sheets

U.S. PATENT DOCUMENTS

| | | |
|---|---|---|
| 4,829,560 A | 5/1989 | Evanyk et al. |
| 4,879,740 A | 11/1989 | Nagashima et al. |
| 4,922,517 A | 5/1990 | West, Jr. et al. |
| 4,941,168 A | 7/1990 | Kelly, Jr. |
| 4,942,599 A | 7/1990 | Gordon et al. |
| 4,955,050 A | 9/1990 | Yamauchi |
| 4,964,154 A | 10/1990 | Shimotono |
| 4,972,457 A | 11/1990 | O'Sullivan |
| 5,003,595 A | 3/1991 | Collins et al. |
| 5,027,384 A | 6/1991 | Morganstein |
| 5,054,051 A | 10/1991 | Hoff |
| 5,109,400 A | 4/1992 | Patsiokas et al. |
| 5,117,450 A | 5/1992 | Joglekar et al. |
| 5,134,645 A | 7/1992 | Berken et al. |
| 5,189,525 A | 2/1993 | Kotani |
| 5,197,092 A | 3/1993 | Bamburak |
| 5,206,901 A | 4/1993 | Harlow et al. |
| 5,218,628 A | 6/1993 | Ito |
| 5,222,123 A | 6/1993 | Brown et al. |
| 5,224,146 A | 6/1993 | Tanaka et al. |
| 5,227,893 A | 7/1993 | Ett |
| 5,239,571 A | 8/1993 | Takahashi |
| 5,243,645 A | 9/1993 | Bissell et al. |
| 5,251,248 A | 10/1993 | Tokunaga et al. |
| 5,291,302 A | 3/1994 | Gordon et al. |
| 5,297,191 A | 3/1994 | Gerszberg |
| 5,297,192 A | 3/1994 | Gerszberg |
| 5,321,737 A | 6/1994 | Patsiokas |
| 5,323,450 A | 6/1994 | Goldhagen et al. |
| 5,329,578 A | 7/1994 | Brennan et al. |
| 5,353,331 A | 10/1994 | Emery et al. |
| 5,384,825 A | 1/1995 | Dillard et al. |
| 5,384,826 A | 1/1995 | Amitay |
| 5,406,616 A | 4/1995 | Bjorndahl |
| 5,418,837 A | 5/1995 | Johansson et al. |
| 5,438,608 A | 8/1995 | Kojima |
| 5,448,378 A | 9/1995 | Matsumoto |
| 5,452,347 A | 9/1995 | Iglehart et al. |
| 5,454,032 A | 9/1995 | Pinard et al. |
| 5,469,496 A | 11/1995 | Emery et al. |
| 5,479,483 A | 12/1995 | Furuya et al. |
| 5,481,382 A | 1/1996 | Takahashi et al. |
| 5,481,605 A | 1/1996 | Sakurai et al. |
| 5,483,531 A | 1/1996 | Jouin et al. |
| 5,487,099 A | 1/1996 | Maekawa |
| 5,493,609 A | 2/1996 | Winseck, Jr. et al. |
| 5,495,485 A | 2/1996 | Hughes-Hartogs |
| 5,506,887 A | 4/1996 | Emery et al. |
| 5,507,033 A | 4/1996 | Dolan |
| 5,515,422 A | 5/1996 | MeLampy et al. |
| 5,521,719 A | 5/1996 | Yamada |
| 5,524,045 A | 6/1996 | Yazawa |
| 5,524,146 A | 6/1996 | Morrisey et al. |
| 5,526,403 A | 6/1996 | Tam |
| 5,537,467 A | 7/1996 | Cheng et al. |
| 5,537,610 A | 7/1996 | Mauger et al. |
| 5,541,925 A | 7/1996 | Pittenger et al. |
| 5,548,636 A | 8/1996 | Bannister et al. |
| 5,550,904 A | 8/1996 | Andruska et al. |
| 5,568,489 A | 10/1996 | Yien et al. |
| 5,579,375 A | 11/1996 | Ginter |
| 5,592,541 A | 1/1997 | Fleischer, III et al. |
| 5,594,777 A | 1/1997 | Makkonen et al. |
| 5,606,604 A | 2/1997 | Rosenblatt et al. |
| 5,608,786 A | 3/1997 | Gordon |
| 5,621,539 A | 4/1997 | Brown et al. |
| 5,631,745 A | 5/1997 | Wong et al. |
| 5,661,785 A | 8/1997 | Carpenter et al. |
| 5,673,118 A | 9/1997 | Kondo et al. |
| 5,689,547 A | 11/1997 | Molne |
| 5,689,825 A | 11/1997 | Averbuch et al. |
| 5,699,407 A | 12/1997 | Nguyen |
| 5,715,301 A | 2/1998 | Terasaki et al. |
| 5,719,922 A | 2/1998 | Bremer et al. |
| 5,722,076 A | 2/1998 | Sakabe et al. |
| 5,724,656 A | 3/1998 | Vo et al. |
| 5,732,074 A | 3/1998 | Spaur et al. |
| 5,737,701 A | 4/1998 | Rosenthal et al. |
| 5,742,905 A | 4/1998 | Pepe et al. |
| 5,757,902 A | 5/1998 | Mitsuo |
| 5,764,639 A | 6/1998 | Staples et al. |
| 5,767,788 A | 6/1998 | Ness |
| 5,768,350 A | 6/1998 | Venkatakrishnan |
| 5,790,640 A | 8/1998 | Tassa et al. |
| 5,790,790 A | 8/1998 | Smith et al. |
| 5,793,762 A | 8/1998 | Penners et al. |
| 5,799,254 A | 8/1998 | Karmi et al. |
| 5,802,160 A | 9/1998 | Kugell et al. |
| 5,802,460 A | 9/1998 | Parvulescu et al. |
| 5,805,298 A | 9/1998 | Ho et al. |
| 5,815,562 A | 9/1998 | Iglehart et al. |
| 5,822,416 A | 10/1998 | Goodacre et al. |
| 5,825,759 A | 10/1998 | Liu |
| 5,826,196 A | 10/1998 | Cuthrell |
| 5,832,388 A | 11/1998 | Williams et al. |
| 5,832,390 A | 11/1998 | Irvin |
| 5,832,506 A | 11/1998 | Kuzma |
| 5,835,861 A | 11/1998 | Whiteside |
| 5,839,067 A | 11/1998 | Jonsson |
| 5,841,840 A | 11/1998 | Smith et al. |
| 5,841,843 A | 11/1998 | Bristow et al. |
| 5,844,979 A | 12/1998 | Raniere et al. |
| 5,861,883 A | 1/1999 | Cuomo et al. |
| 5,862,207 A | 1/1999 | Aoshima |
| 5,870,549 A | 2/1999 | Bobo, II |
| 5,870,677 A | 2/1999 | Takahashi et al. |
| 5,884,185 A | 3/1999 | Kim |
| 5,884,191 A | 3/1999 | Karpus et al. |
| 5,889,839 A | 3/1999 | Beyda et al. |
| 5,889,845 A | 3/1999 | Staples et al. |
| 5,890,064 A | 3/1999 | Widergen et al. |
| 5,896,441 A | 4/1999 | Akazawa et al. |
| 5,901,359 A | 5/1999 | Malmstrom |
| 5,901,362 A | 5/1999 | Cheung et al. |
| 5,907,598 A | 5/1999 | Mandalia et al. |
| 5,909,650 A | 6/1999 | Jonsson |
| 5,912,918 A | 6/1999 | Bauchot et al. |
| 5,913,166 A | 6/1999 | Buttitta et al. |
| 5,913,176 A | 6/1999 | Barabash |
| 5,918,181 A | 6/1999 | Foster et al. |
| 5,920,815 A | 7/1999 | Akhavan |
| 5,920,863 A | 7/1999 | McKeehan et al. |
| 5,924,044 A | 7/1999 | Vannatta et al. |
| 5,926,760 A | 7/1999 | Khan et al. |
| 5,940,752 A | 8/1999 | Henrick |
| 5,940,770 A | 8/1999 | Kuki |
| 5,943,414 A | 8/1999 | McIntee et al. |
| 5,943,611 A | 8/1999 | Molne |
| 5,953,392 A | 9/1999 | Rhie et al. |
| 5,956,331 A | 9/1999 | Rautiola et al. |
| 5,956,652 A | 9/1999 | Eriksson |
| 5,960,363 A | 9/1999 | Mizikovsky et al. |
| 5,966,660 A | 10/1999 | Jonsson |
| 5,966,667 A | 10/1999 | Halloran et al. |
| 5,974,312 A | 10/1999 | Hayes, Jr. et al. |
| 5,978,451 A | 11/1999 | Swan et al. |
| 5,978,672 A | 11/1999 | Hartmaier et al. |
| 5,983,098 A | 11/1999 | Gerszberg et al. |
| 5,983,282 A | 11/1999 | Yucebay |
| 5,987,499 A | 11/1999 | Morris et al. |
| 5,991,637 A | 11/1999 | Mack, II et al. |
| 5,995,843 A | 11/1999 | Sjodin et al. |
| 6,009,088 A | 12/1999 | Taguchi et al. |
| 6,009,323 A | 12/1999 | Heffield et al. |
| 6,011,975 A | 1/2000 | Emery et al. |
| 6,014,377 A | 1/2000 | Gillespie |
| 6,018,665 A | 1/2000 | Chavez, Jr. et al. |
| 6,018,666 A | 1/2000 | Chavez, Jr. |
| 6,021,138 A | 2/2000 | Lee |
| 6,021,335 A | 2/2000 | Zicker |
| 6,023,241 A | 2/2000 | Clapper |
| 6,028,764 A | 2/2000 | Richardson et al. |
| 6,035,193 A | 3/2000 | Buhrmann et al. |
| 6,041,045 A | 3/2000 | Alterman et al. |
| 6,047,198 A | 4/2000 | Sudo |
| 6,052,573 A | 4/2000 | Ohmori et al. |
| 6,052,579 A | 4/2000 | McC Estabrook |

| | | | | | | |
|---|---|---|---|---|---|---|
| 6,052,581 A | 4/2000 | O'Connell et al. | 6,405,041 B1 | 6/2002 | Mukerjee et al. | |
| 6,069,588 A | 5/2000 | O'Neill, Jr. | 6,463,055 B1 * | 10/2002 | Lupien et al. | 370/353 |
| 6,073,029 A | 6/2000 | Smith et al. | 6,477,559 B1 | 11/2002 | Veluvali et al. | |
| 6,073,033 A | 6/2000 | Campo | 6,539,237 B1 | 3/2003 | Sayers et al. | |
| 6,085,112 A | 7/2000 | Kleinschmidt et al. | 6,567,657 B1 | 5/2003 | Holly et al. | |
| 6,088,431 A | 7/2000 | LaDue | 6,597,686 B1 * | 7/2003 | Smyk | 370/352 |
| 6,088,596 A | 7/2000 | Kawakami et al. | 6,625,275 B1 | 9/2003 | Miyauchi | |
| 6,094,478 A | 7/2000 | Shepherd et al. | 6,694,004 B1 | 2/2004 | Knoerle et al. | |
| 6,115,616 A | 9/2000 | Halperin et al. | 6,711,401 B1 | 3/2004 | Chow et al. | |
| 6,122,502 A | 9/2000 | Grundvig et al. | 6,718,173 B1 | 4/2004 | Somani et al. | |
| 6,122,509 A | 9/2000 | Nguyen | 6,760,412 B1 | 7/2004 | Loucks | |
| 6,125,287 A | 9/2000 | Cushman et al. | 6,771,761 B1 | 8/2004 | LaPierre | |
| 6,137,525 A | 10/2000 | Lee et al. | 6,781,983 B1 * | 8/2004 | Armistead | 370/353 |
| 6,169,911 B1 | 1/2001 | Wagner et al. | 6,788,936 B1 | 9/2004 | Rune et al. | |
| 6,175,731 B1 | 1/2001 | Ohsuge | 2002/0001302 A1 * | 1/2002 | Pickett | 370/352 |
| 6,178,331 B1 | 1/2001 | Holmes et al. | 2002/0013141 A1 | 1/2002 | Cox et al. | |
| 6,181,952 B1 | 1/2001 | Murata | 2002/0019246 A1 | 2/2002 | Forte | |
| 6,185,435 B1 | 2/2001 | Imura | 2002/0085516 A1 * | 7/2002 | Bridgelall | 370/329 |
| 6,192,259 B1 | 2/2001 | Hayashi | 2002/0122545 A1 | 9/2002 | Schwab et al. | |
| 6,275,577 B1 | 8/2001 | Jackson | 2002/0128023 A1 | 9/2002 | Forte | |
| 6,307,845 B1 * | 10/2001 | Hummelgren et al. | 370/328 | 2004/0142693 A1 * | 7/2004 | Feder et al. | 455/443 |
| 6,324,410 B1 | 11/2001 | Giacopelli et al. | 2004/0218747 A1 * | 11/2004 | Ranalli et al. | 379/218.01 |
| 6,381,323 B1 | 4/2002 | Schwab et al. | | | | |

* cited by examiner

METHOD AND APPARATUS FOR COMMUNICATING WITH ONE OF PLURAL DEVICES ASSOCIATED WITH A SINGLE TELEPHONE NUMBER DURING A DISASTER AND DISASTER RECOVERY

This application is a divisional of application Ser. No. 10/440,090, filed May 19, 2003, now U.S. Pat. No. 7,292,858 which is a continuation-in-part (C-I-P) of application Ser. No. 09/593,543 filed on Jun. 14, 2000, now U.S. Pat. No. 7,305,079 which claims priority from provisional application Ser. Nos. 60/139,498, filed Jun. 14, 1999, and 60/185,070 filed Feb. 25, 2000, all of which are hereby incorporated by reference in their entireties.

BACKGROUND

It has become relatively common for individuals to possess a number of different devices through which they communicate. For example, a person may have a home telephone, a wireless telephone, a pager and an office telephone. As the population becomes increasingly mobile, making contact with a person through one of these communication devices has become more difficult.

Call forwarding is one method of addressing this problem. Certain telephone systems allow users to enter another number to which a call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding. A significant drawback to this forwarding strategy is that, in each leg of the forwarded call, the calling party is terminated on the last device or network in the chain. It follows that the final number in the forwarding scheme is responsible for all available enhanced services or voice mail available to the caller. Accordingly, although a call may have been initially placed to an office telephone equipped with voice mail and/or operator assist, all such enhanced services of the corporate network are lost once the call is forwarded off the corporate PBX (e.g., to the user's wireless telephone).

Travel can also exacerbate the difficulty of establishing communication with an individual having access to multiple telephone devices. Upon checking into a hotel, the telephone in a traveler's hotel room becomes available as yet another potential means of contact. Unfortunately, this forces a calling party to decide whether to attempt to contact the traveler through his or her room telephone or other telephone device (e.g., wireless telephone or pager). If the traveler does not answer the called telephone, the calling party then must decide whether to leave a message (unaware of when, or if, the message will be retrieved) or instead attempt to reach the traveler via his or her other telephone. Likewise, if the traveler is expecting an important call but is unsure whether it will be placed to his room telephone or wireless telephone, the traveler may feel compelled to remain within his room until the call has been received. In addition, if the traveler's wireless telephone does not support certain types of long distance calls (e.g., to various foreign countries), the traveler may be able to place certain types of calls only from his or her hotel room.

The office telephone is the primary point of contact of most business people. Typically, corporations invest significantly in their office telephone infrastructure, which often includes voice mail, paging and unified messaging systems. In addition, most corporations have negotiated contracts with their telephone carriers (e.g., local and long distance carriers) to ensure they obtain the lowest possible rates for calls placed via their corporate network. However, because the corporate workforce is becoming increasingly mobile, more business people are using wireless telephones to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., interoffice voice mail, direct extension dialing, etc.) that corporate users have come to expect in the office environment.

A solution to the aforementioned problems would be to allow wireless telephony devices (e.g., wireless telephones or pagers) to access an office telephone system as though they were desktop telephones connected to the company's PBX. It is desirable to incorporate wireless devices into the PBX network so that users may place and receive telephone calls using the office PBX telephone system even though they are at a remote location (e.g., out of the office). This would allow the enhanced conveniences of today's PBX networks (e.g., interoffice voice mail, direct extension dialing, etc.) to be available on wireless devices—something which is desperately needed in today's society.

There have been recent attempts to incorporate wireless telephones into PBX networks. One system provided by Ericsson, requires the creation of a mini-cellular network within the confines of the enterprise. A cellular switching unit, unique wireless telephones and an auxiliary server are required to route inbound telephone calls to a wireless handset serving as a remote office telephone.

An in-building wireless system has been proposed by Nortel Networks. This system requires the wiring of pico-cells throughout the enterprise's building. The system routes inbound telephone calls to specialized wireless telephones serving as additional office PBX telephones. The wireless telephones cannot be used as conventional standard wireless telephones until they leave the premises.

These systems allow inbound calls to be routed to an office telephone and a wireless telephone, but they are not without their shortcomings. For example, each system requires specialized cellular equipment and wireless handsets. Moreover, the systems only use the wireless telephones for inbound telephone calls. In addition, these systems cannot use the wireless telephone as a conventional wireless telephone (i.e., not part of the enterprise's PBX network) within the building.

A major disaster causing an enterprise's office telephone infrastructure or PBX network to become destroyed or inoperable may permanently damage the manner in which the enterprise communicates internally and with the outside world during the disaster and may also damage the manner in which the enterprise conducts its business after the disaster. For example, an enterprise, its employees and telephone infrastructure may be located in one or several large office buildings. The infrastructure has previously established direct inward dial (DID) telephone numbers in which the outside world may communicate with the employees, as well as internal extensions by which the employees may communicate with each other. All of the DID telephone numbers, extensions, and voice mail boxes, etc. likely will be wiped out if the PBX network gets destroyed (e.g., if the building housing the PBX network is destroyed due to terrorists, natural disaster or other occurrence).

Currently, in the wake of such a disaster, there is no way for the telephone company to reroute all of the enterprise's DID telephone numbers to another telephone infrastructure or PBX network. This means that during the disaster there will be no way for the outside world to communicate with the enterprise, hampering disaster recovery efforts. Presuming that the enterprise can continue to operate after such a disaster (e.g., relocate to another location, such as another branch of the enterprise), future business still will be hampered because the outside world can no longer reach the enterprise via the thousands of previously established DID numbers. At best, the DID numbers can be terminated at voice mail boxes, but the employees will never be able to receive calls at the numbers again. Moreover, the destruction of the PBX network results in the destruction of the enterprise's internal extensions, which impedes the employees' ability to contact each other and perform daily operations. These problems will occur whether the enterprise's PBX network incorporates wireless telephones or not. Thus, there is a desire and need for a telecommunications system that can allow communications to continue through the enterprise's DID numbers and internal extensions during a disaster and during disaster recovery.

There is also a desire and need to determine the status of the enterprise's employees, portions of the physical enterprise (e.g., its west wing), and portions of the enterprise network itself during various situations. This need exists, for example, during emergency situations such as a disaster where it becomes necessary to determine whether employees have lived through the disaster, whether the employees have exited the premises and are safe, or whether the employees have become trapped or are in need of medical assistance. Determining the status of employees and portions of the building during the progression of the emergency enables the enterprise to dispatch emergency personnel to the appropriate locations within the enterprise. This same status would also be useful in non-emergency situations where the monitoring of employees, building, or telecommunications network is required for some enterprise related reason.

In certain enterprise networks such as, for example, a military or government enterprise network, there exists a precedence protocol that provides higher ranking officers or government personnel the ability to break into or preempt an existing telephone call based on the priority level of the officer/government official. Often times, this is required during an emergency or other situation in which the higher ranking official must communicate with a particular individual and cannot wait until the individual completes the current call. This is sometimes referred to as MLPP, but is referred to herein as "priority preemption." Priority preemption, however, is limited to the telephones connected to the enterprise network, which limits the ability of the higher ranking official to contact the appropriate individual (who may also be a high ranking officer or government official) when the need arises. It is desirable to extend the priority preemption capability to wireless and remote devices so that priority users are able to preempt existing communications and communicate with certain individuals even though that individual is using a wireless telephone or other remote device.

Further, certain governmental enterprise networks need to be sufficiently flexible to maintain communication while protecting its workforce from threatened harm. For example, threats lodged against a particular facility must be taken seriously, and employees at that facility may be evacuated or advised not to come into the facility. Additionally, it is sometimes of benefit to spoof a telephone number, or project a different telephone number to the recipient of the telephone call than the actual number being called from.

SUMMARY

A system for (and a method of) selectively establishing communication with one of plural devices associated with a single telephone number during a disaster or disaster recovery period. The method can offer disaster recovery to an enterprise depending upon its size, financial well-being and desired capabilities. For example, the enterprise has the option of owning or renting all of the equipment required so that it may perform disaster recovery on its own and with little outside intervention. The enterprise may own some or none of the necessary equipment and contract with a service bureau so that the bureau provides recovery equipment when needed.

The system also provides the ability to determine the status of employees and portions of the building during the progression of the emergency, employee movement and recovery events. This enables the enterprise to dispatch emergency personnel to the appropriate locations within the enterprise.

The system also provides a priority preemption capability to wireless and remote devices associated with the enterprise network's wireless connection unit so that priority users are able to preempt existing communications and communicate with certain individuals even though that individual is using a wireless telephone or other remote device.

The system also provides for the seamless switching between circuit (e.g., cellular) and packet (e.g., voice over IP) services based on a proximity of the service and user preferences.

In one embodiment of the invention, the method provides telecommunication services to an enterprise operating a first telecommunication network connected to a first wireless connection unit. The method comprises providing a second wireless connection unit; copying a first database of the first wireless connection unit into a second database in the second wireless connection unit, the second database comprising a plurality of telephone extensions each associated with a first communication device connected to the first telecommunication network and a second communication device; and, servicing a communication destined for an extension of the first telecommunication network via the second wireless connection unit.

In another embodiment, the method provides telecommunication services to an enterprise operating a first telecommunication network. The method comprises the steps of providing a wireless connection unit connected to the first telecommunication network; maintaining a database of telephone extensions of the first telecommunication network, each extension being associated with a first communication device connected to the first telecommunication network and a second communication device; and, servicing a communication destined for an extension of the first telecommunication network via the wireless connection unit.

In yet another embodiment, the method comprises providing a first wireless connection unit connected to the first telecommunication network and providing a second wireless connection unit connected to a second telecommunication network. The method further comprises copying a first database of the first wireless connection unit into a second database in the second wireless connection unit, the second database comprising a plurality of telephone extensions each associated with a first communication device connected to the first telecommunication network and a second communication device; and, servicing a communication destined for an extension of the first telecommunication network via the second wireless connection unit.

In another embodiment, the invention performs a method that determines a status of users of an enterprise telecommunication network. The method comprises the steps of simultaneously broadcasting a request for status message to a plurality of different communication devices associated with telephone numbers of each user of the enterprise network and inputting responses from at least some of the devices. The method determines the status of the users from the input responses.

In yet another embodiment, the invention performs a method of preempting a wireless communication on a first device associated with a telephone extension of an enterprise telecommunications network. The communication includes a first user associated with the extension and the method comprises the steps of inputting at a wireless connection unit a priority preemption signal from a second device and determining at the wireless connection unit a priority of a second user sending the priority preemption signal and a priority of the first user. If it is determined that the wireless communications can be preempted, the method interrupts the wireless communication and creates a wireless communication between the first and second devices.

In a further embodiment, the invention performs a method of switching a telephone call from a circuit communication network to a data packet communication network, where the call is associated with a telephone extension of an enterprise communication network. The method detects that a wireless device associated with the extension can handle the call on the packet communication network; determines whether the call should be switched to the packet communication network based on user preferences associated with the extension; and, if it is determined that the call should be switched to the packet communication network, bridges the call to the packet communication network.

In a further embodiment, the invention performs a method of switching a telephone call from a data packet communication network to a circuit communication network, where the call is associated with a telephone extension of an enterprise communication network. The method comprises the steps of detecting that a wireless device associated with the extension can handle the call on the circuit communication network; determining whether the call should be switched to the circuit communication network based on user preferences associated with the extension; and, if it is determined that the call should be switched to the circuit communication network, bridging the call to the circuit communication network.

DETAILED DESCRIPTION OF PREFERRED EMBODIMENTS

Preferred embodiments and applications of the invention will now be described. Other embodiments may be realized and structural or logical changes may be made to the disclosed embodiments without departing from the spirit or scope of the invention. Although the preferred embodiments disclosed herein have been particularly described as applied to a business or office environment, it should be readily apparent that the invention may be embodied for any use or application having the same or similar problems.

The invention is more fully understood with reference to the preferred embodiments depicted in FIGS. 1-5. A first exemplary embodiment of the invention is discussed and illustrated with reference to its implementation within an office building or other enterprise establishment. In an office, for example, personnel are assigned to offices (or cubicles) with each office having an associated telephone. The office telephones are typically connected to a PBX, exchange, or other call processing infrastructure. The PBX allows each office telephone to have its own telephone extension and a direct inward dial (DID) telephone number. As known in the art, a telephone extension is typically a three or four digit telephone number where station-to-station (i.e., office-to-office) calls can be placed by dialing the three or four digit extension. This is commonly referred to as direct extension dialing. As also known in the art, a DID telephone number allows external calls (i.e., calls initiated outside of the office PBX) to be placed directly to the office telephone.

The invention is not to be limited to any particular environment. The invention may be implemented, for example, in a hotel, boarding house, dormitory, apartment, or other commercial or residential establishment, where individuals are assigned to a unique extension or DID telephone number. The term "office" as used herein encompasses a singular room or space within a business or other enterprise, or a hotel room or similar facility. The term "user" as used herein encompasses office personnel, hotel guests or other individuals associated with a telephone extension and DID telephone number.

Figure 1:
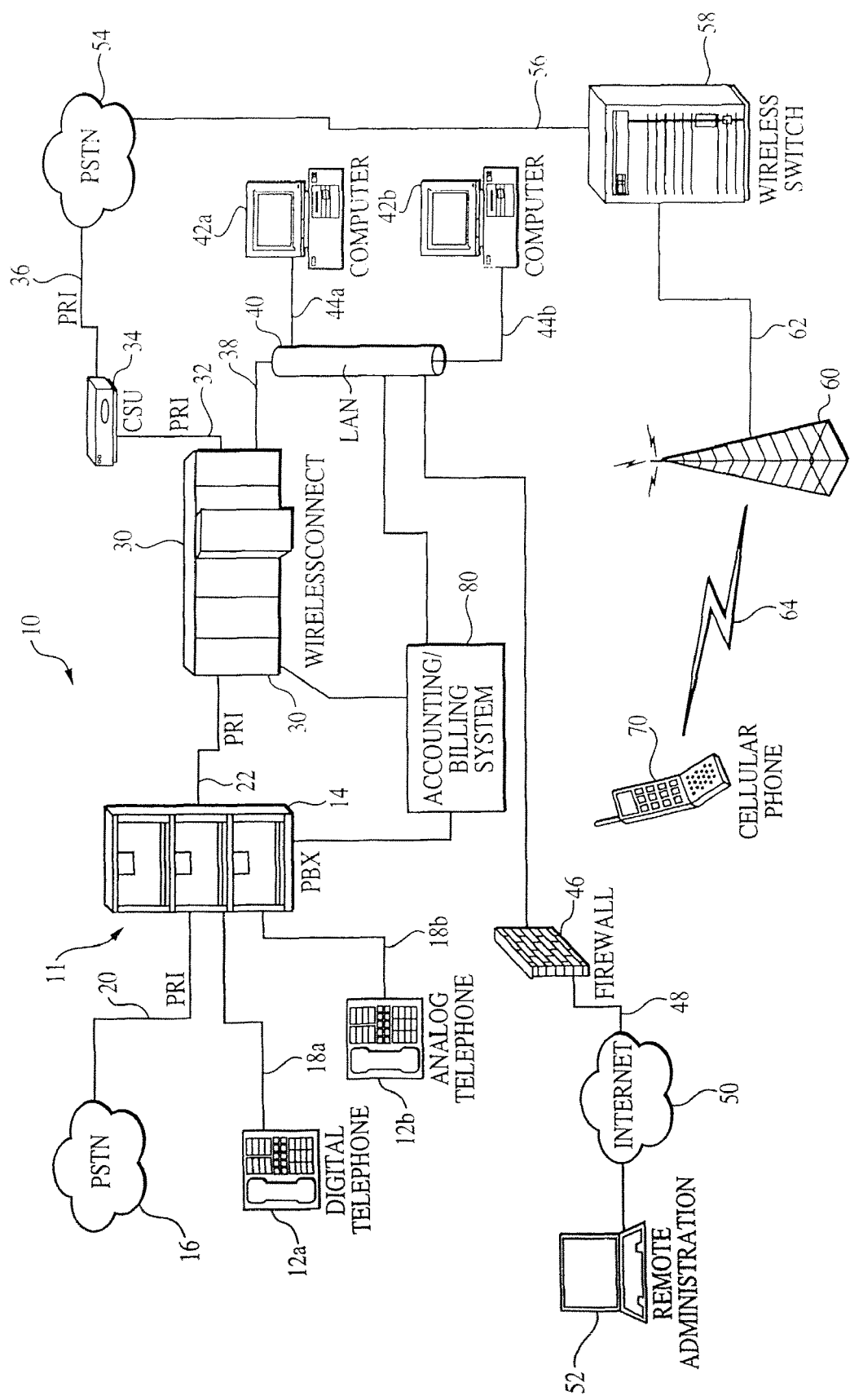
FIG. 1 illustrates an exemplary telecommunication system constructed in accordance with an embodiment of the invention.

FIG. 1 illustrates an exemplary telecommunication system 10 constructed in accordance with an embodiment of the invention. As will be discussed below, the system 10 provides for a full integration of remote telephony devices, such as a wireless telephone 70, into an office or hotel PBX or other communications network. In doing so, the system 10 can selectively establish communications with one of a plurality of telephony devices associated with a particular telephone extension or DID telephone number. Moreover, the system 10 will allow remote devices such as the wireless telephone 70 to perform as a fully functional standard office telephone 12a, 12b for both inbound and outbound communications. That is, a remote device will be able to use features of the office network (e.g., direct extension dialing, corporate dialing plan, etc.) even though the device is not within the confines of the office or not directly connected to the office PBX. The system also allows the wireless telephone 70 to operate as an independent wireless telephone if so desired. That is, the wireless telephone 70 may receive calls placed to its (non-office) DID telephone number even though the system 10 routes PBX calls to the telephone 70.

The system 10 as particularly illustrated herein includes a conventional office PBX network 11. The PBX network 11 may include a plurality of standard telephones 12a, 12b respectively connected to a conventional PBX 14 via communication lines 18a, 18b. The PBX 14, which may be any commercially available one such as a Meridian 1 PBX produced by Nortel Networks, is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, the invention is not to be limited to the particular type of telephone used in the system 10.

The PBX 14 is coupled to a wireless connection unit (WC) 30. The WC 30 is connected to the PBX 14 in this embodiment by a PRI connection 22 or other suitable communication medium. The WC 30 is also connected to a PSTN 54 by a PRI connection or other suitable digital communication medium. The illustrated PRI connection between the WC 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the WC 30 and the PSTN 54 is one of many suitable connections. Accordingly, the invention should not be limited to the illustrated connection. The WC 30 is one of the mechanisms that allows the integration of remote devices (e.g., wireless telephone 70) into the PBX network 11 and its operation will be described below in more detail.

The WC 30 is preferably connected to a local area network (LAN) 40 by an appropriate communication medium 38. Although a LAN 40 is illustrated, it should be appreciated that any other network could be used. A plurality of computers (e.g., 42a, 42b) may be respectively connected to the LAN 40 by any appropriate communication lines 44a, 44b. The computers 42a, 42b can be used by network administrators or others to maintain WC 30 and other portions of the system 10. The LAN 40 may also be connected to the Internet 50 by a suitable communication medium 48. A firewall 46 may be used for security purposes. In a preferred embodiment, Internet 50 can be used to allow a remote administration device 52 (e.g., a personal computer) to perform remote administration of WC 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless device, such as the wireless telephone 70. The wireless device could also be a pager, personal digital assistant (PDA), landline telephone, facsimile machine or other wired/wireless communication device. It may be desirable for the wireless device to be capable of handling both (or either) digital and analog communication signals. It should be noted that any type of wireless communication protocol (or a combination of different protocols), such as TDMA, CDMA, GSM, AMPS, MSR, iDEN, WAP, etc., could be used.

It should be appreciated that the WC 30 is connected to a wireless carrier through a PSTN 54 and not by unique hardware or an in-office cellular network. As a result, WC 30 only has to interface with conventional components, such as the PBX 14 and PSTN 54. Thus, the system is substantially technology independent. Moreover, special wireless devices are not required, which allows the remote device to function in its conventional manner (e.g., as a separate wireless telephone) and as part of the PBX network 11 (if so desired).

The WC 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the wireless telephone 70 or other remote device. This immediate billing feature is not present in other PBX or enterprise networks and is particularly useful for corporate environments such as law firms and government agencies, and hotel environments, where up to date billing information is essential.

Figure 2:
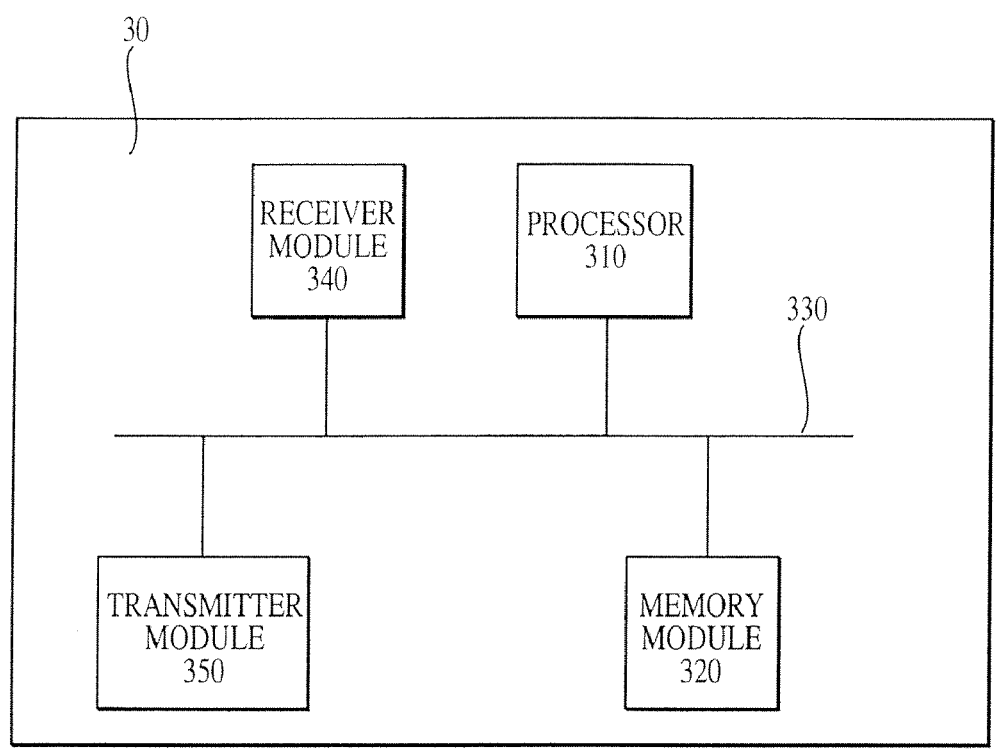
FIG. 2. illustrates a wireless connection unit in accordance with an embodiment of the invention.

As noted above, the WC 30 allows for the full integration of remote devices into the PBX network 11. In a preferred embodiment, WC 30 is a processor-based stand-alone unit capable of handling communications directed to the PBX network 11. In a preferred embodiment, WC 30 is composed of one or more processors generically represented by processor module 310 executing one or more computer programs stored in one or more memory units generically represented by memory module 320, which is coupled to processor module 310 via bus 330, as shown in FIG. 2. Memory module 320 also contains one or more databases and other processing memory used during the overall operation of system 10, as will be described below. Receiving and transmitting modules 340, 350, respectively, which are coupled to processor module 310 and memory module 320 via bus 330, are employed to receive and transmit information to the PBX and PSTN during call processing, as well as receiving and transmitting other information such as administrative information.

The modules (310, 320, 330, 340, 350) making up WC 30 may be implemented using any known hardware or software devices. For example, in one embodiment, workload performed by receiving and transmitting modules 340, 350, as well as some of the processing functions of processor module 310 of WC 30 are implemented using one or more conventional processor-based programmable telephony interface circuit cards used to interface WC 30 with PBX 14 and the PSTN. They are programmed to perform the conventional telephony services required to place and receive calls, as well as programmed to perform the unique call processing functions described below. The WC 30 preferably contain a database of office extension numbers (also referred to herein as PBX extensions) and DID telephone numbers associated with each existing PBX extension. The database will be stored on a computer readable storage medium, which may be part of (e.g., in memory module 320) or connected to the WC 30. The database may also contain a wireless connection/PBX extension (hereinafter referred to as a "WC-PBX extension") and one or more remote device telephone numbers associated with each PBX extension. In this embodiment, software running on the telephony cards interfaces with the database to perform the various call processing functions discussed below.

In this embodiment, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the WC 30 over the PRI 22 between the WC 30 and the PBX 14. In addition, the CDP steering table of the PBX 14 directs the routing of all WC-PBX extensions received from the WC 30 to the appropriate office telephone.

Figure 3:
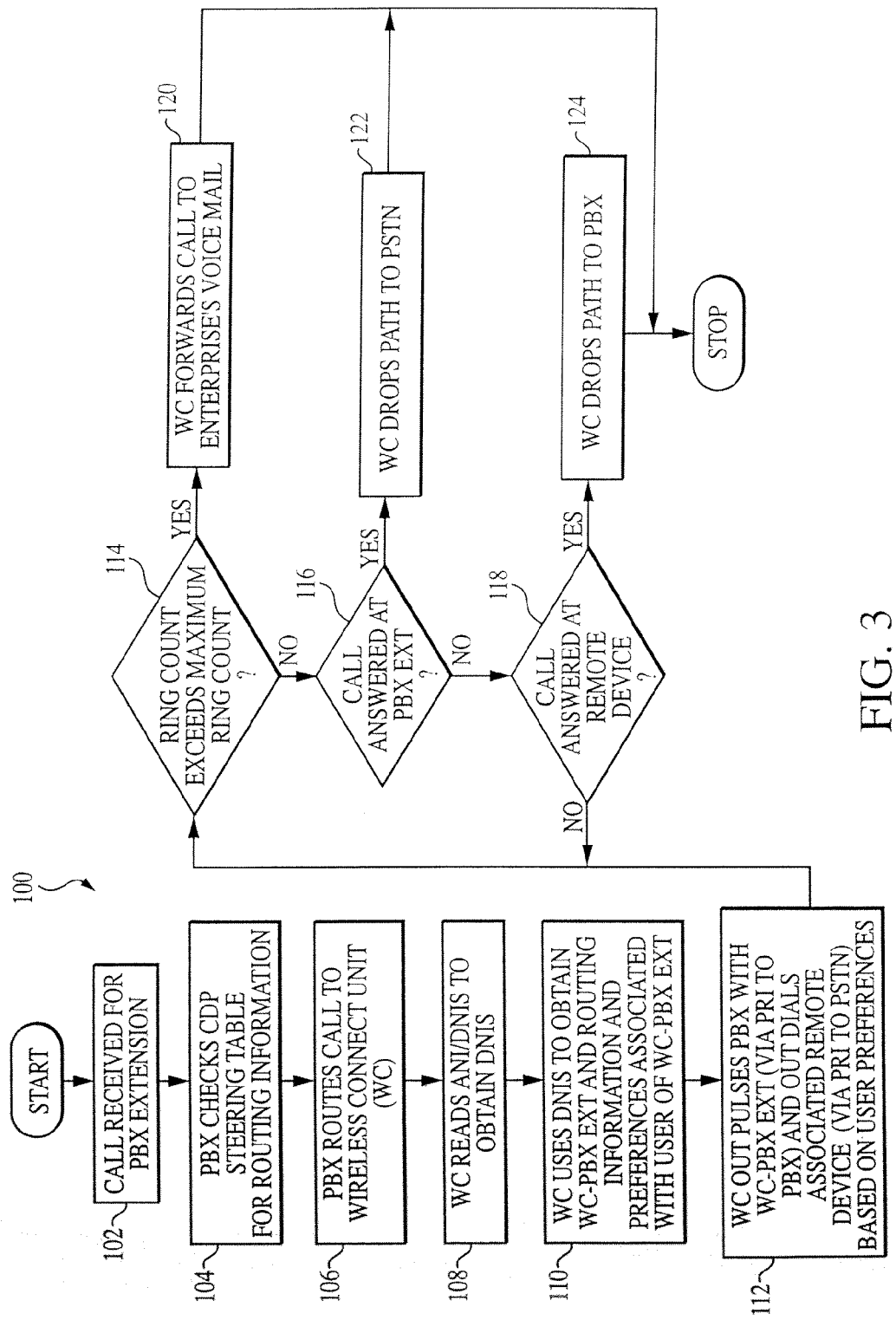
FIG. 3 illustrates in flowchart form exemplary inbound station-to-station call processing performed in accordance with an embodiment of the invention.
Figure 4:
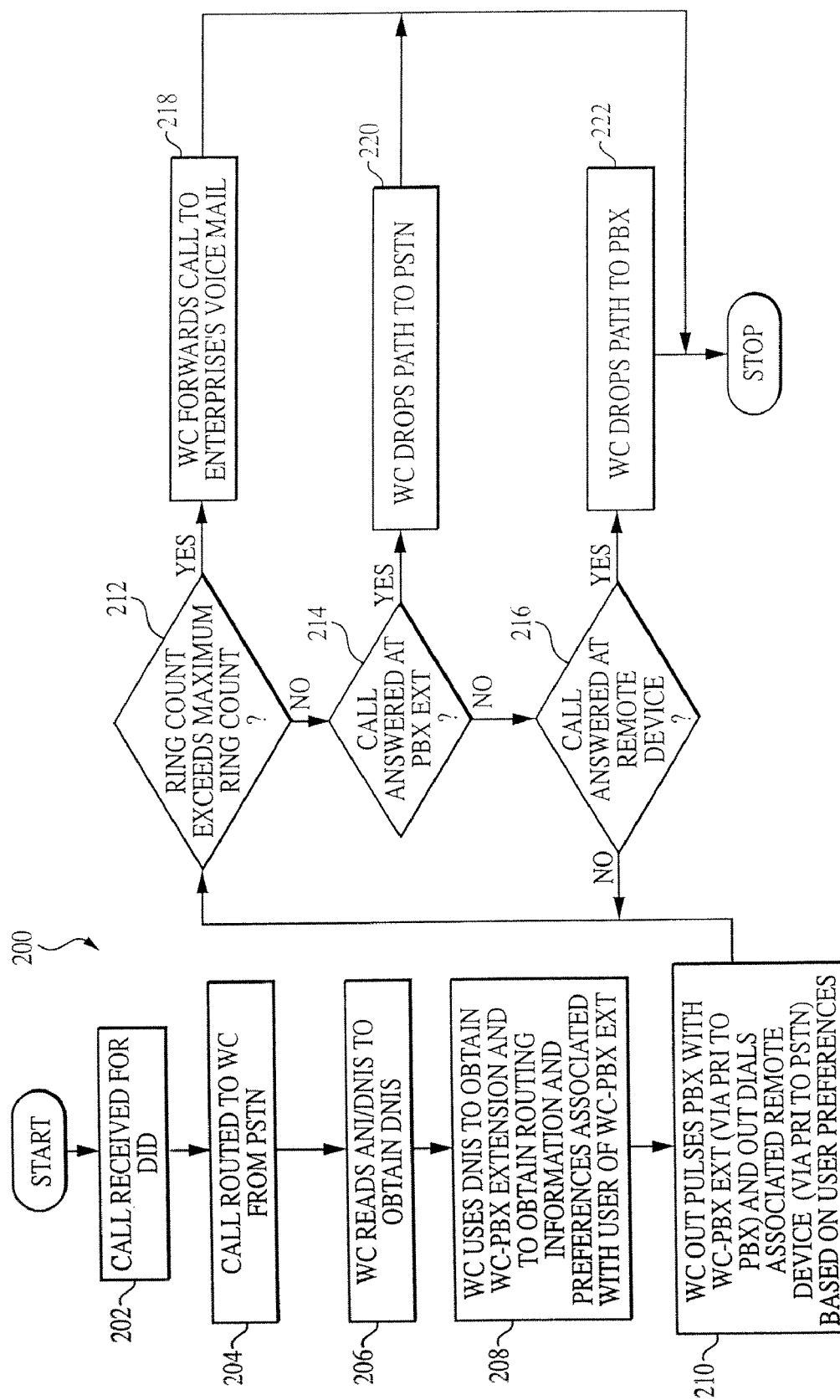
FIG. 4 illustrates in flowchart form exemplary inbound direct inward dialing (DID) call processing performed in accordance with an embodiment of the invention.
Figure 5:
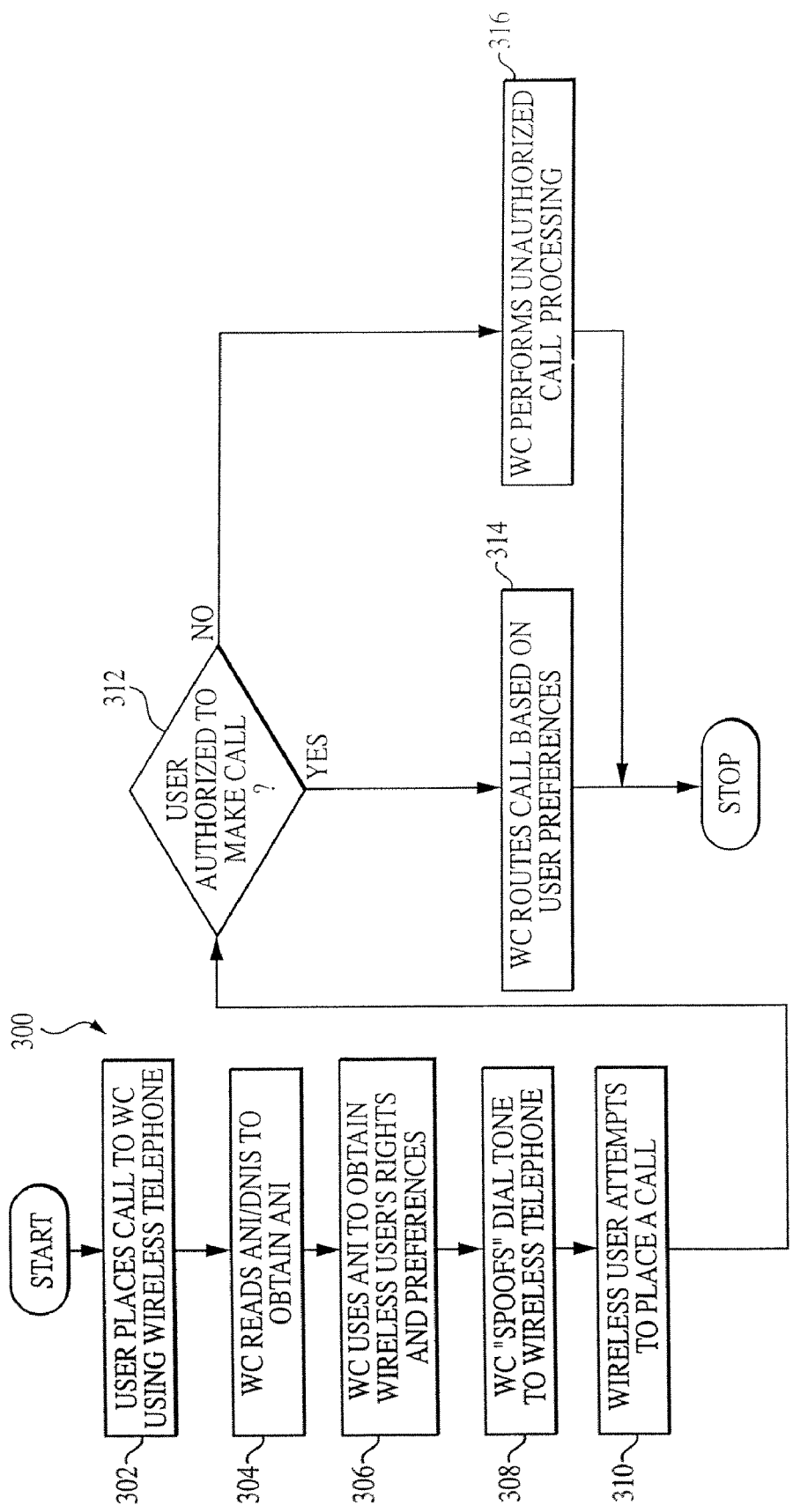
FIG. 5 illustrates in flowchart form exemplary remote outbound call processing performed in accordance with an embodiment of the invention.

In accordance with a preferred embodiment of the invention, processor module 310 executes one or more programs stored in memory module 320 to process calls received through PBX 14 or PSTN. FIGS. 3, 4 and 5 illustrate some of the basic call processing events which WC 30 may be programmed to handle in accordance with exemplary embodiments of the invention. As illustrated in FIG. 3, when an incoming station-to-station call (i.e., a direct extension call from one internal telephone device to another internal device) is received by the PBX 14 for an existing PBX extension (step 102), the PBX 14 looks up the PBX extension in the CDP steering table (step 104) to determine where the call should be routed. Based on the CDP steering table the call to the PBX extension is routed to the WC 30 instead of directly to an office telephone 12a (step 106).

As is known in the art, the incoming call will have automatic number identification (ANI) and dialed number identification service (DNIS) information. The ANI identifies the telephone number of the calling party and is traditionally used for "caller ID." DNIS identifies the telephone number of the called party. The WC 30 reads the ANI/DNIS information from the incoming call to obtain the DNIS information (step 108). As noted above, the WC 30 has assigned a new WC-PBX extension to each existing PBX extension. The WC-PBX extension, routing information, and user preferences are obtained by using the DNIS information (identifying the PBX extension) as an index into the WC 30 database (step 110). Routing information will include any additional remote telephone numbers or voice mail box numbers, or other identification numbers of communication devices associated with the PBX extension.

At step 112, the WC 30 out pulses the PBX 14 through the PRI connection 22 between the WC 30 and PBX 14 with the WC-PBX extension obtained in step 110. This causes the PBX 14 to ring the associated office telephone (e.g., telephone 12a). At the same time (if desired), the WC 30 attempts to contact one or more alternative communication devices (e.g., by out dialing a remote telephone number via the PRI connection between the WC 30 and the PSTN 54). In such embodiment, the station-to-station call is thus routed to both the office telephone and also to at least one remote device 70 simultaneously or substantially simultaneously (or as determined by the user preferences). It should be noted that the illustrated processing 100 is one example of how an incoming station-to-station call may be handled. Individual user preferences may alter the way the call is processed. It should be noted that in a preferred embodiment, the WC 30 is dialing the remote device telephone number and out pulsing the PBX 14 with the WC-PBX extension. This gives the WC 30 control over the connections to the office telephone 12a and the remote device 70. It should also be noted that the WC 30 can out dial several remote numbers, if so desired, and that the invention should not be limited to the dialing of one remote number.

At step 114, it is determined if the current ring count (i.e., number of rings) exceeds the maximum ring count defined by the user. Since the WC 30 is controlling the call at this time it can track the number of rings. If the ring count exceeds the maximum ring count, then the WC 30 (if desired) forwards the call to the enterprise's voice mail (step 120). If the ring count does not exceed the maximum ring count, the WC 30 determines if the call is answered at the PBX extension (step 116). The PBX 14 will issue an off-hook message to the WC 30 if the appropriate office telephone is answered. If it is determined that the call is answered at the PBX extension, the WC 30 drops the call's path to the remote device via the PSTN 54 and maintains the path to the PBX 14 (step 122).

In a preferred embodiment, it may be desired that the call to the remote device is actually answered by the user and not by a service of the wireless carrier. In known systems, wireless carriers often answer a call if there is a bad connection, the wireless channels are overloaded or for other reasons (such as initiating a wireless carrier's answering service). When the wireless carrier answers the call in these situations, the call would appear to WC 30 as an "answered call" even if the remote user did not answer the call itself.

One way to distinguish a user answered call from a wireless service answered call is to prompt the user to transmit an acknowledgement signal such as a dual tone multi-frequency (DTMF) tone to the WC 30 via the keypad of the remote device. Upon detecting the answered call, WC 30 can send a voice message instructing the user to "press 1 to complete the call or press 2 to send caller to voice mail." If the DTMF tone is not received, then the WC 30 presumes that the call was answered by the wireless carrier, or that the user does not want to answer the call which the WC 30 treats as an unanswered call. If at step 118, it is determined that the remote device was answered by the user, the WC 30 drops the WC-PBX extension path to the PBX and initiates the connection between the calling party and the remote device (step 124). If the call is not answered at the remote device in step 118, process flow returns to step 114 to check whether the ring count has exceeded the maximum ring count. It should be noted that, if desired, the WC 30 can forward an unanswered call to voice mail or play an interactive menu to the calling party, which allows the calling party to page the called party, leave a voice mail message or to transfer to an operator.

In accordance with a preferred embodiment of the invention, the database of WC 30 may also contain numerous system-defined user access rights and user modifiable preferences, which can alter the call processing of the invention. An office administrator may use the network computers 42a, 42b or a remote administration device 52 to set user access rights and priorities (example discussed below with respect to outbound call processing 300 illustrated in FIG. 5). The user may use the remote administration device 52 to set numerous user preferences. It is desirable that a Web-based or graphical user interface be used so that the user can easily access and set user preferences. The network computers 42a, 42b (or remote device 52) may also be used by the user if so desired.

User preferences may include how the user associated with a particular PBX extension wants incoming calls to be routed. For example, the user can request that incoming calls be routed to the office telephone and one or more remote devices simultaneously. The user instead can request that an incoming call be routed to the office telephone first, then after a user-defined number of rings, the remote device and eventually sent to the PBX voice mail. Alternatively, the user can request that an incoming call be routed to the remote device first, then the office telephone, and subsequently to the PBX voice mail. The user can request that all incoming calls be routed directly to the PBX voice mail. The user can request that a menu of options be played to the caller so that the caller can decide how to complete the call. The user can set separate ring counts for the office telephone and remote device. The user can set dial tone options, which allows the user to control how long a dial tone is played before a dial tone time-out occurs. The user can adjust the time between dials. These are just a few of the user preferences that can be stored and used by the WC 30, which can alter incoming and out going call processing. If the user does not change the user preferences, or only changes a few preferences, system defaults are used.

When receiving an inbound DID call, call processing flow 200 (as illustrated in FIG. 4) is performed in accordance with an embodiment of the invention. At step 202, a DID telephone call is dialed by an external telephone device and received by system 10 through the PSTN. In a preferred embodiment, PSTN has been programmed in advance to route all DID telephone numbers used by the system 10 to the WC 30. In addition, the PSTN has also been programmed to route calls incoming to the DID telephone number directly to the PBX 14 if the path to the WC 30 has failed. That is, the embodiment incorporates a failure path into the system 10 to ensure that a failure of the WC 30 or the PRI connection between the WC 30 and the PSTN does not interrupt the operation of the office PBX network 11. This is possible since the steering table of the office PBX 14 contains the DID telephone numbers. The PBX 14 has the capability to resolve these DID numbers. Thus, the PBX 14 can be used if needed to handle DID telephone calls. For purposes of this discussion, it is presumed that the WC 30 and the connection between the WC 30 and the PSTN 54 are fully operational. Thus, at step 204, the PSTN routes the DID call to the WC 30.

The WC 30 reads the ANI/DNIS information from the incoming DID call to obtain the DNIS information (step 206). The WC 30 resolves the call by determining what WC-PBX extension is associated with the telephone number identified by the DNIS. The WC-PBX extension, routing information and user preferences are obtained by the WC 30 (step 208). At step 210, the WC 30 out pulses the PBX 14 through the PRI connection 22 between the WC 30 and PBX 14 with the obtained WC-PBX extension. This causes the PBX 14 to ring the associated office telephone (e.g., telephone 12a). At the same time (if desired), the WC 30 out dials one or more user designated remote telephone numbers via the PRI connections between the WC 30 and the PSTN 54. Therefore, the inbound DID telephone call is routed to the office telephone and remote device simultaneously (or as determined by the user preferences). It should be noted that the illustrated processing 200 is just one example of how an incoming DID call may be handled.

At step 212, it is determined whether the current ring count exceeds the maximum ring count defined by the user. If the ring count exceeds the maximum ring count, then the WC 30 forwards the call to the enterprise's voice mail (step 218). If the ring count does not exceed the maximum ring count, the WC 30 determines whether the call is answered at the PBX extension (step 214). If it is determined that the call is answered at the PBX extension, the WC 30 drops the call's path to the remote device(s) via the PSTN 54 and maintains the path to the PBX 14 (step 220). If at step 214 it is determined that the call is not answered at the PBX extension, the WC 30 determines if the call is answered at the remote device (step 216). In a preferred embodiment, it may be desired that the call to the remote device is actually answered by the user and not by a service of the wireless carrier. Therefore, to distinguish a user answered call from a wireless service answered call, the WC 30 may prompt the user to transmit a DTMF tone to the WC 30 via the remote device when the user answers the call. If the DTMF tone is not received, then the WC 30 preferably presumes that the call was answered by the wireless carrier, which is interpreted by the WC 30 as an unanswered call. If at step 216 it is determined that the remote device was answered by the user, the WC 30 drops the path to the PBX 14 and maintains the connection to the remote device (step 222). (As an alternative, control and responsibility for the remainder of the call can be left with the PSTN in order to free up PRI channels between WC 30 and PSTN 54.) If the call is not answered at the remote device in step 216, process returns to step 212 to check whether the ring count has exceeded the maximum ring count.

Initially, the call processing reduces the processing load on the PBX 14, since the WC 30 (and not PBX 14) is resolving the DID telephone numbers. This allows the PBX 14 to handle call processing for more extensions if desired. Additionally, since the WC 30 is resolving the DID calls, the WC 30 can out pulse the PBX 14 and out dial the PSTN 54 simultaneously (if desired) without waiting for the PBX 14 to process/resolve the call. Moreover, as noted above, redundancy is provided by allowing the PBX network 11 to function as a standard PBX if the WC 30 or the link between the WC 30 and the PSTN 54 fails.

In accordance with a preferred embodiment, WC 30 allows a remote device such as a wireless telephone 70 to act as an office PBX telephone for outbound telephone calls following call processing flow 300 illustrated in FIG. 5. That is, a user will be able to use its wireless telephone (or any remote device) to make station-to-station calls as if he were using an office telephone directly connected to the office PBX 14. From the remote device, the user will also be able to perform other PBX functions as well. At step 302, a user places a call to the WC 30 from the remote device. One way for the user to do this would be to define a speed dial key (or sequence of keys) on the wireless telephone handset. When the user activates the appropriate speed dial key/keys, the wireless telephone dials into the WC 30. Another way to dial into the WC 30 would be by fixed dialing. Fixed dialing is a feature provided by the wireless carrier to always connect the wireless telephone to a particular number or service, and, in this case, it would connect the user to the WC 30. Any number of other methods may be used to dial into the WC 30.

At step 304, the WC 30 reads the ANI/DNIS information received from the remote device to obtain the ANI information. The ANI identifies the telephone number of the wireless telephone. The WC 30 uses the ANI information to obtain the wireless user's access rights and user preferences (step 306). As noted above, a user is provided with the ability to set various user preferences. The enterprise itself has the ability to set access rights defining what type of calls the user can place from the remote device (e.g., local, long distance, international, station-to-station, etc.). For example, if using PRI connections between the PSTN 54 and the WC 30, the PBX 14 and the WC 30, and the PBX 14 and the PSTN 16, users can be assigned into particular access groups by assigning each user to a particular channel or group of channels of the PRI. The user assignments can be stored in a database memory within memory module 320 of WC 30 for access during a validation or authentication process performed by processor module 310. In the alternative, the responsibility over the user assignments can be incorporated into PBX 14 or some other (on-site/remote) equipment.

As is known in the art, in North America and Japan, for example, each PRI contains 23 "B" channels that can be used for voice communications. Each B channel can be programmed with different calling capabilities by the PBX 14. That is, some channels can be programmed for all types of calls (e.g., international, long distance, local etc.), others for long distance and local calls, while others can be programmed solely for local or internal station-to-station calls. The channels can also be restricted to a limited number of authorized telephone numbers as well. The programming can be determined by the enterprise. Since the channels can be programmed with different calling capabilities, the enterprise can implement different access groups, with each group defining a user's remote device access.

This feature significantly Limits the enterprise's remote device (e.g., wireless service) costs because user access to services can be substantially restricted. For example, the enterprise may want delivery personnel to have a wireless telephone for internal dialing purposes, but may be afraid of misuse by the personnel. Implementing the above embodiment, the enterprise can group all wireless telephones assigned to its delivery personnel to a channel(s) restricted solely to internal calls. Any grouping is possible. Priorities may also be assigned. A user assigned to group 1 (programmed for all calling capabilities) may be given priority to bump a user assigned to group 2 (having less calling capabilities) in the event that the channels assigned to group 1 are busy. Any grouping or priority scheme can be implemented by the enterprise and is application specific.

At step 308, the WC 30 "spoofs" a dial tone to the wireless telephone. That is, the WC 30 generates and transmits a dial tone to the wireless telephone 70 as if the user had picked up an office telephone 12a connected to the PBX 14. In a preferred embodiment, the spoofing of the dial tone is achieved by the WC internally generating the appropriate tone (e.g., through software or hardware modules). The dial tone is then played to a wireless telephone as a prompt while waiting to receive DTMF digits from the wireless user indicating the telephone number the user wishes to dial. At this point in the call process flow 300, the user is connected to the office PBX and may access any of its standard features. For purposes of this illustrated embodiment, it is presumed that the user wishes to place an outbound call at this time. At step 310, the user attempts to place a call and the WC 30 receives the number dialed by the user. At step 312, the WC 30 determines if the user is authorized to make the call. For example, the WC 30 checks the user's access rights, and if the user is authorized to place the call, the call is routed to the correct channel by the WC 30 based on user preferences, access rights and the channel definitions (step 314). If the user is not authorized to place the call (i.e., the call exceeds the user's access rights), the WC 30 performs unauthorized call processing (step 316). Unauthorized call processing may include playing a message to the user stating that the user does not have authority to place the call, disconnecting the call, or any other action desired by the enterprise.

If the user decides to place a station-to-station call, for example, the call would appear to be an internally dialed call at the destination office telephone. For example, if the PBX 14 uses a different ring for internal calls, then the internal ring would be sent to the office telephone even though the call was made by the wireless telephone. If the PBX 14 normally displays the PBX extension of the calling party on the called office phone, then the PBX extension of the calling party would be displayed on the called office telephone even though the call was initiated by the wireless telephone.

Many enterprises have already provided wireless communications devices to their personnel. These wireless devices already have existing telephone numbers and are external to the enterprise PBX. Since the devices are already in use by personnel and their clients, the enterprise does not want to change their telephone numbers. There is a need to integrate these telephone numbers into the enterprise PBX. One way to integrate these telephone numbers would be to forward their unanswered calls to the PBX voice mail. This can be accomplished by the invention whether the wireless telephone number is associated with a PBX extension or not.

For example, the enterprise can purchase additional DID telephone numbers from the telephone company (if necessary). These additional DID telephone numbers are stored in the database of the WC 30 together with special routing instructions to route all calls directly to a user's PBX voice mail box (or other destination as desired). The user of a wireless telephone can program the wireless telephone to forward unanswered calls to his associated DID telephone number. Alternatively, the user can have the wireless carrier forward unanswered calls to the DID telephone number as well. This way, any unanswered call to the wireless telephone will be forwarded to the WC 30, which resolves the DID and forwards the call to the appropriate PBX voice mail box. Using this feature, the likelihood is increased that the user will retrieve his messages since he can retrieve all of his messages through the PBX voice mail. This also alleviates the need for the user to have a separate voice mail service from the wireless carrier, which may reduce the cost of the wireless service.

The invention can be embodied in any number of different applications. One embodiment, for example, applies the invention to a hotel having a large number of rooms with dedicated phones lines for each room to provide a second or "virtual phone line" without routing additional telephone lines or other wiring to the room. Each room would have the original hard-wired telephone extension that is connected to the enterprise PBX, as well as a wireless telephone associated with the PBX extension (integrated using the invention) serving as a second or virtual telephone line. If, for example, a guest of the hotel were using the hard-wired telephone line for his personal computer, he could still make and receive calls through the PBX with the wireless telephone. Thus, the invention allows an enterprise to double its telephone lines without incurring the expense of additional wiring required to install a second line for the hotel rooms.

Another exemplary embodiment involves application of the invention to facilitate communications in enterprises that have large offices located in different parts of the country.

Typically, these enterprises utilize separate PBX networks for each location. The separate PBX networks are often connected together using tie-lines, so that one location can make a station-to-station call to the other location. That means person A at location A can contact person B at location B using the PBX networks. The call will be a long distance call, but the enterprise usually negotiates a discount rate with the telephone carrier for dedicated, low rate long distance service. However, if person B is not in his office, person A will have to use other means to contact person B. This typically involves a call to person B's wireless telephone, which would be an expensive long distance wireless telephone call. In this embodiment, using a WC unit in location B, the office and wireless telephones associated with person B would ring simultaneously. If person B answers the wireless telephone, the enterprise will not incur an expensive long distance wireless telephone charge. Instead, since the WC unit at location B is initiating the wireless telephone call, the wireless call will only be a relatively inexpensive local call to the pertinent wireless carrier. Moreover, if the enterprise can contract with the wireless carrier to get unlimited local wireless telephone calls, the charge to the enterprise would be even less. Where a WC unit is installed in both locations A and B, person A can also place the call from a wireless telephone (through the WC unit at location A) to person B, who can answer the call with a wireless telephone (through the WC unit at location B). That is person A and person B can communicate through their respective PBX networks even though person A and person B are away from their offices when the call is placed.

Figure 6:
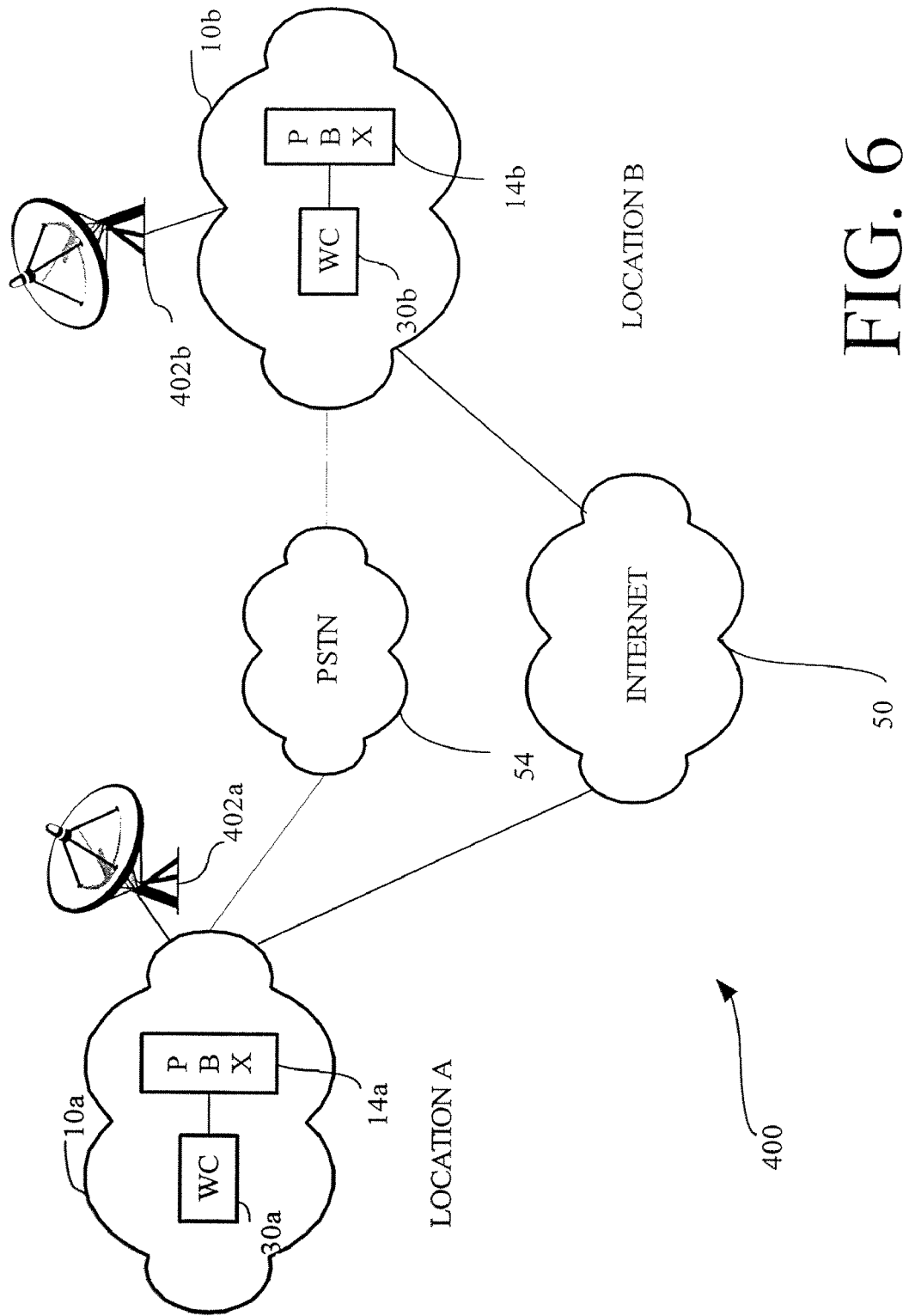
FIG. 6 illustrates an exemplary telecommunication system constructed in accordance with another embodiment of the invention.

FIG. 6 illustrates an exemplary telecommunication system 400 constructed in accordance with another embodiment of the invention. As will be explained below, the system 400 overcomes many shortcomings of existing enterprise PBX networks, particularly those shortcomings that arise during and/or in disaster and disaster recovered situations. The system 400 includes two telecommunication systems 10a, 10b constructed in accordance with the embodiments of the invention described above with reference to FIGS. 1-5. That is, each system 10a, 10b includes a wireless connection (WC) unit 30a, 30b connected with a respective conventional office PBX 14a, 14b, which are in turn in connection with a PSTN 54. Both systems 10a, 10b may also be connected to a large area network (LAN), wide area network (WAN), the Internet 50 or any other networked communication medium. Although FIG. 6 illustrates that the systems 10a, 10b are connected to one PSTN 54, it should be appreciated that the systems 10a, 10b may be connected to different and multiple PSTN's if desired.

The first system 10a is provided at a location A while the second system 10b is provided at a location B. Preferably, location A and location B are not in the same building. In an exemplary embodiment, the first system 10a serves as a telecommunications infrastructure for an enterprise's office provided at location A (e.g., New York office), while the second system 10b serves as a telecommunications infrastructure for the enterprise's office provided at location B (e.g., Los Angeles office). As described above with reference to FIGS. 1-5, the WC 30a of the first system 10a will contain a database of office extensions (e.g., PBX extensions) as well as DID telephone numbers, WC-PBX extensions and one or more remote device telephone numbers associated with a respective PBX extension. The system 10a will also have the ability to store user preferences to control the manner in which telephone calls are routed to the extensions, remote devices or voicemail (described above). All of the telephone numbers, extensions and user preferences stored in the WC 30a of the first system 10a are associated with extensions at location A.

Similarly, the WC 30b of the second system 10b will contain a database of office extensions (e.g., PBX extensions) as well as DID telephone numbers, WC-PBX extensions and one or more remote device telephone numbers associated with a respective PBX extension. The system 10b will also have the ability to store user preferences to control the manner in which telephone calls are routed to the extensions, remote devices or voicemail (described above). All of the telephone numbers, extensions and user preferences stored in the WC 30b of the second system 10b are associated with extensions at location B. For the most part, the systems 10a, 10b operate as described above with reference to FIGS. 1-5.

As part of the system's 400 disaster recovery processing, the two WC units 30a, 30b, replicate each other's databases. That is, the first WC 30a, servicing the extensions at location A, receives a copy of the second WC's 30b database so that it will have a copy of location B's PBX extensions, DID telephone numbers, WC-PBX extensions, remote device telephone numbers and user preferences if needed (i.e., in the case where the WC 30b becomes destroyed or inoperable). Likewise, the second WC 30b, servicing the extensions at location B, receives a copy of the first WC's 30a database so that it will have a copy of location A's PBX extensions, DID telephone numbers, WC-PBX extensions, remote device telephone numbers and user preferences if needed (i.e., in the case where the WC 30a becomes destroyed or inoperable).

As will be discussed below with reference to FIG. 7, if for some reason the infrastructure of the first system 10a becomes destroyed or inoperable, the enterprise can reroute its entire internal office-to-office extensions and external DID telephone numbers through the second system 10b with just a simple telephone call to the PSTN handling location A's telephone service. The second system 10b, in particular the second WC 30b, then functions to route calls to the extensions at both locations A and B. No extension or DID numbers need to be changed. This is accomplished with relative ease. The PSTN handling location A's telephone service has been programmed in advance to route the DID telephone numbers of location A to the first WC 30a. If WC 30a becomes inoperable, the PSTN servicing location A needs merely to change the telephone number from the number associated with the first WC 30a (part of the inoperable system) to the telephone number associated with the second WC 30b (part of the operable system).

Likewise, if for some reason the infrastructure of the second system 10b becomes destroyed or inoperable, the enterprise can reroute its entire internal office-to-office extensions and external DID telephone numbers through the first system 10a with just a simple telephone call to the PSTN handling location B's telephone service. The first system 10a, in particular the first WC 30a functions to route calls to the extensions of location A and location B. No extension or DID numbers need to be changed. As noted above, the PSTN has already been programmed in advance to route the DID telephone numbers of location B to the second WC 30b (now part of an inoperable system). During the disaster, the PSTN servicing location B need merely change the telephone number from the number associated with the second WC 30b (inoperable system) to the telephone number associated with the first WC 30a (operable system).

It should be appreciated that once the PSTN reroutes the DID telephone numbers to the operable WC, for example, the first WC 30a, the operable WC 30a can perform the functions described above with respect to FIGS. 1-5 for both enterprise systems 10a, 10b. The operable WC 30a serves as a recovery server for the inoperable WC 30b. Thus, users of the inoperable WC 30b, will be able to receive and make telephone calls on a remote device, such as wireless telephone 70, in the manner described above via the recovery server (WC 30a). The recovery server (e.g., WC 30a) could also implement an emergency voice mail system for the inoperable WC 30b. The users of both systems 10a, 10b still will be able to modify user preferences through the Internet 50 or other network connection. For example, the user may wish to prevent the office telephone extension from ringing since it no longer exists. Similarly, the administrator of the operable WC 30a may choose to perform a global change to the rerouted user's preferences to prevent the missing office telephone extensions from ringing, rather than having individual users do it themselves.

The replication of the databases (described below with reference to FIG. 8) may be performed in any suitable manner. For example, the two WC's 30a, 30b may transfer the database information over the Internet 50. The database information may also be sent through the PSTN 54 connection or by satellite communications via respective satellite equipment 402a, 402b (FIG. 6).

By means of an example only, it is presumed that the infrastructure of location A has been destroyed by an act of terrorism or some other disaster, which destruction includes the building housing the system 10a and the offices of the enterprise. During the disaster and its immediate aftermath it is desirable for the employees of the enterprise to maintain communications with the outside world (e.g., call for help, alert loved ones that they are safe, initiate disaster recovery steps, etc.). Since the now destroyed enterprise infrastructure contained a WC 30a backed up by a WC 30b at another location, it is possible for the employees to send and receive calls on their wireless devices once the system 400 initiates its disaster recovery processing.

Figure 7:
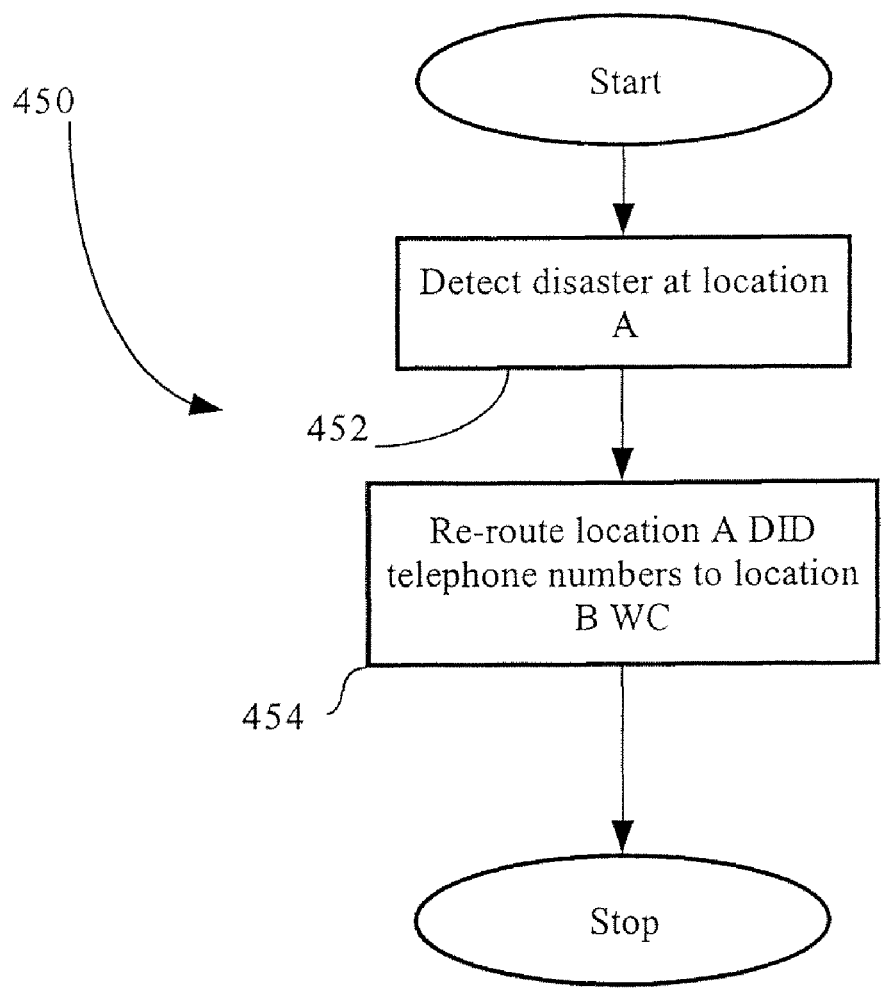
FIG. 7 illustrates in flowchart form exemplary disaster recovery processing performed in accordance with an embodiment of the invention.

FIG. 7 illustrates in flowchart form exemplary disaster recovery processing 450 performed in accordance with an embodiment of the invention. The first act is to detect whether there has been a disaster or other occurrence at location A that has rendered the enterprise's telecommunication system 10a inoperable (step 452). Once detected, the next step performed is to alert the PSTN 54 to reroute the DID telephone numbers for location A to the WC 30b of the second system 10b. It should be appreciated that these steps may be performed by an administrator of the system, who detects the disaster and then initiates a call to the PSTN. It should also be appreciated that these steps may be performed automatically by the PSTN. That is, when the PSTN attempts to place a call to the WC 30a, it can detect a busy circuit, circuit overload, etc. an automatically reroute the DID telephone numbers for location A to the WC 30b of the second system 10b. This "automatic rollover" feature can be set-up with the PSTN at any time the enterprise desires.

Once the PSTN 54 completes the rerouting, which may be a matter of minutes depending upon the number of DID telephone numbers that need to be rerouted, the location A external DID telephone numbers as well as its PBX and WC-PBX extensions, remote device telephone numbers and user preferences will be in existence and handled by the second WC 30b. None of the location A extensions or DID numbers will have been changed. Thus, the enterprise experiences minimal down time despite that fact that the disaster may still be ongoing (e.g., burning building). To the employees and the outside world, the rerouting of the services goes unnoticed. In fact, once the disaster is over, the enterprise can continue to conduct internal and external communications as though the enterprise is still functioning at location A.

Figure 8:
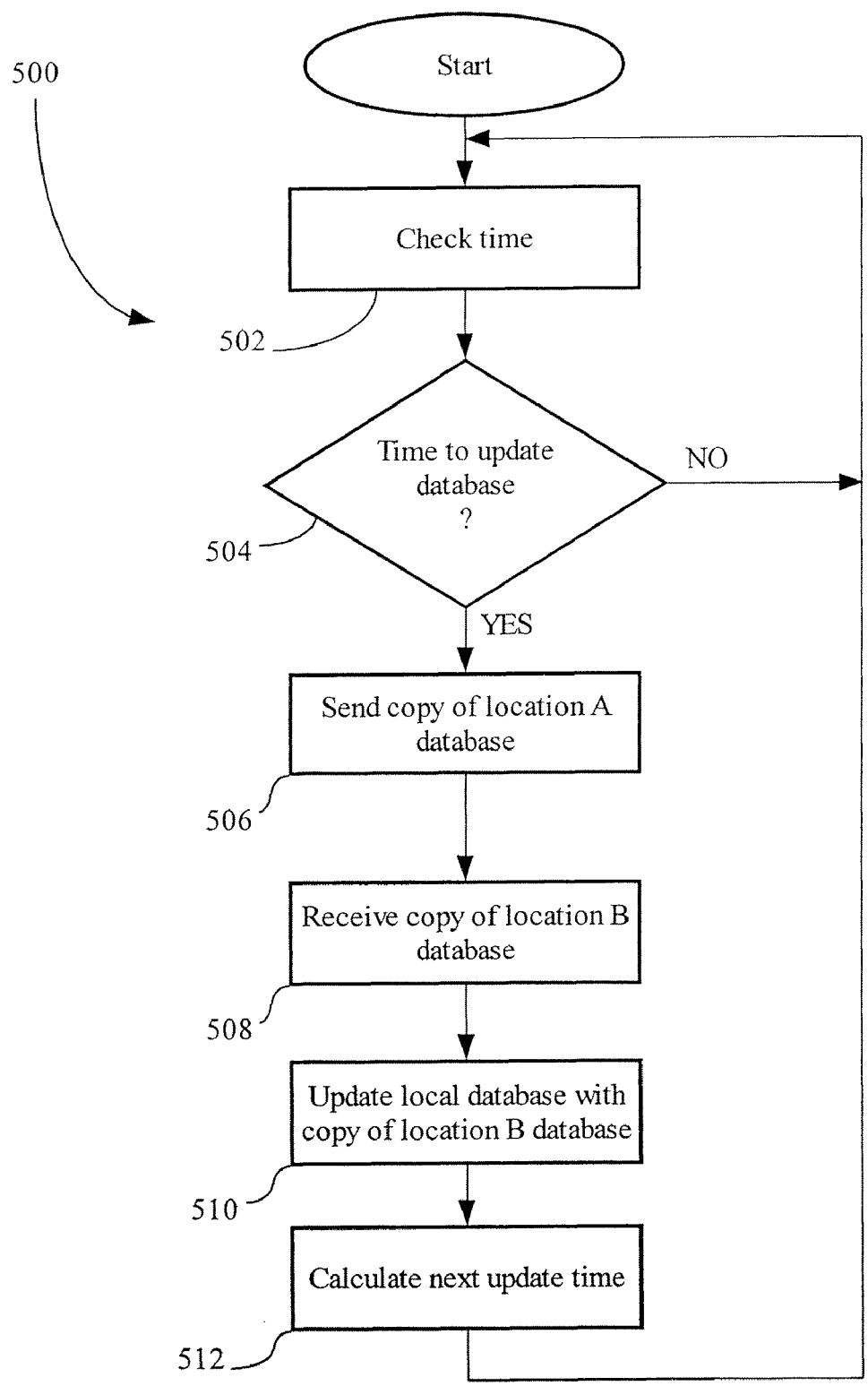
FIG. 8 illustrates in flowchart form exemplary database replication processing performed in accordance with an embodiment of the invention.

Essential to the aforementioned processing is the replication of the databases on the first and second WC's 30a, 30b. FIG. 8 illustrates in flowchart form exemplary database replication processing 500 performed in accordance with an embodiment of the invention. For this example, it is presumed that the first WC 30a located at location A is performing the processing 500. It should be appreciated, however, that both WC 30a and WC 30b perform the processing 500. Initially, the first WC 30a checks its internal time (step 502). At step 504, the first WC 30a determines if it is time to update (i.e., replicate) databases. If it is time to update the databases, the first WC 30a sends a copy of its location A database (step 506) to the WC 30b at location B. It should be appreciated that the first WC 30a will have its main database for processing the location A telephone numbers and either a second database or a separate portion of its main database for storing the location B database information. Whether the WC 30a uses a single large database or two smaller ones is a matter of choice for the enterprise.

Once the first WC 30a sends a copy of the location A information to the WC 30b, it receives a copy of the location B database information from the second WC 30b (step 508). The information can be received in a message transmitted over the Internet 50 or by satellite communications, or it can be received by file transfer protocol (FTP) or any other networked protocol. The system 400 can be designed such that the information may be copied from a shared memory device or server attached to a network connection shared by the two WC units 30a, 30b, or by any other method. Once the information is received, the first WC 30a updates its location B database (step 510). The first WC 30a will then calculate the next update time (step 512). The periodicity of the database updates may be any time satisfactory to the enterprise. It should be appreciated that the databases can be copied in any manner and that the invention is not limited to any particular method or means for the replication.

It should be appreciated that the embodiments of the present invention are suitable for governmental purposes also. For example, presume that a governmental agency was under terrorist attack. Most likely, the governmental employees would be evacuated from their usual location. It may be necessary, however, to contact these employees or for the employees to have access to the PBX network. If the governmental agency was using a system 400 (FIG. 6) constructed in accordance with the embodiments of the invention, the employees would be able to conduct business as usual even though they have been relocated (via a recovery server, for example, WC 30). Most importantly, communications with key personnel will still be possible, which may be needed to launch counter measures against the attack. Thus, the system 400 of the present invention provides a continuity of government even in the most drastic situations.

It should be noted that the invention has been described as being used during a disaster or as part of a disaster recovery. Although this is a major advantage of the invention, it need not be limited to such situations. For example, the invention can be used during any time there is a need to bring down one of the PBX networks (e.g., maintenance), during a mere power failure or circuit overload.

The embodiment illustrated in FIG. 6 can be used as a mechanism by a large enterprise with several offices spread throughout the world to coordinate several PBX networks into a single pseudo-network. In addition, these enterprises having more than one telecommunication system 10 will have multiple telephone numbers to activate outbound call processing from remote devices (described above with reference to FIG. 5) via the multiple WC's 30. It should also be appreciated that the enterprise's system 400 can be enhanced by the "intelligent routing" feature provided by most "800 number" service providers (see below).

That is, the enterprise can obtain a single toll free calling number (e.g., "800 number") so that all of its employees can dial one number to access their appropriate WC unit. Intelligent routing is performed by the service provider such that the appropriate WC unit is selected based upon the location of the employee when she is placing the call to the WC. As long as all of the WC units of the enterprise have replicated each others databases, then it becomes possible for an employee whose office is at location A to access the WC located at location B because she happens to be at the location B office. This allows the user to get the benefits of the location A wireless connection unit/PBX network with a local call even if she is thousands of miles away from location A.

Figure 9:
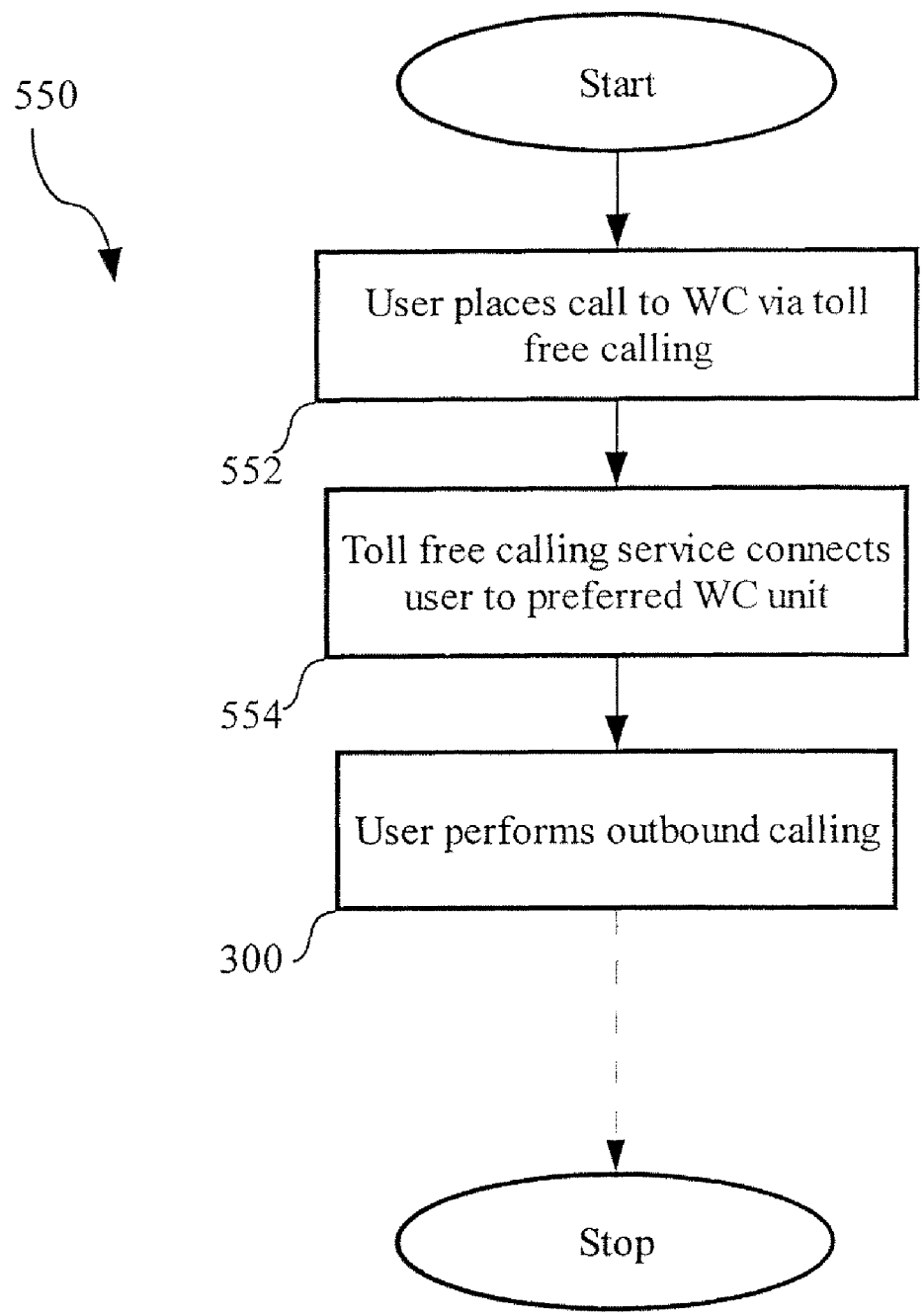
FIG. 9 illustrates in flowchart form exemplary remote outbound call processing performed in accordance with another embodiment of the invention.

FIG. 9 illustrates in flowchart form exemplary remote outbound call processing 550 performed in accordance with another embodiment of the invention. The processing begins when the user places a call from a remote device to a WC via the toll free calling number (step 552). The toll free calling service provider determines the location of the user's remote device and selects the telephone number of the nearest WC and connects the user to that WC (step 554). Once connected, the processing 550 performs the processing 300 described above with reference to FIG. 5. Thus, is it is possible to coordinate multiple WC units and telecommunication systems for use with intelligent routing.

Some enterprises that have PBX networks do not have branch offices or buildings provided at multiple locations as illustrated in FIG. 6. Other enterprises that have multiple offices at different locations may not want to tie their PBX networks together (as such, this enterprise does not have a location B either). For purposes of the following description, these enterprises are referred to herein as "single location" enterprises. It is desirable for the single location enterprises to have the ability to perform disaster recovery in the event that its PBX network becomes inoperable, overloaded, etc.

Referring again to FIG. 6, one way to provide the aforementioned disaster recovery processing to the single location enterprise is to provide the enterprise with a modified system 400. The modified system 400 comprises a telecommunication system 10*a* constructed in accordance with the embodiments described above with reference to FIGS. 1-5, but does not contain the second telecommunication system 10*b*. Rather, the enterprise will maintain and have access to a second WC unit 30*b* that will serve as a dedicated fail-over box as described below.

The single location enterprise will own and operate the system 10*a* within the premises of the enterprise (e.g., location A). This system 10*a* includes a WC unit 30*a* and other components illustrated in FIG. 6. The system 10*a* may be connected to a PSTN 54 and/or a network such as the Internet 50. In the current embodiment, the single location enterprise does not have a location B. To compensate for this, the enterprise can have its second WC unit 30*b* connected directly to a telephone company or PSTN. This second WC unit 30*b* can be located anywhere in the world as long as the WC unit 30*a* of the system 10*a* has the ability to send its database to the second WC unit 30*b* (e.g., described above with reference to FIG. 8, except that the first WC unit 30*a* does not need to copy the database of the second WC unit 30*b*).

Once the second WC unit 30*b* has a copy of the first WC unit's 30*a* database, disaster recovery processing 450 can be performed as described above with respect to FIG. 7. As such, the single location enterprise can perform disaster recovery of its telecommunication system 10*a* by having a dedicated fail-over box (e.g., second WC unit 30*b*), serving as a recovery server, and performing the processing 450 illustrated in FIG. 7.

Some single location enterprises, such as mid-sized businesses, may not want to maintain a dedicated fail-over box. These enterprises may operate a telecommunication system 10*a* to gain the advantages described above with respect to FIGS. 1-5, but may wish to avoid the added expense of a second system 10*b* or second WC unit 30*b*. It is desirable, however, for these "mid-sized" single location enterprises to have the ability to perform disaster recovery in the event that its PBX network becomes inoperable, overloaded, etc.

One way to provide the aforementioned disaster recovery processing to the mid-sized single location enterprise is to provide the enterprise with a telecommunication system 10*a* constructed in accordance with the embodiments described above with reference to FIGS. 1-5 and access to a service bureau designed to replicate the enterprise's database and serve as a WC unit for the enterprise in the event of a disaster. That is, the service bureau maintains a recovery server for the enterprise. Thus, the mid-size single location enterprise will own and operate a single system 10*a* without additional WC units 30*b*, but will still have the ability to perform disaster recovery.

Figure 10:
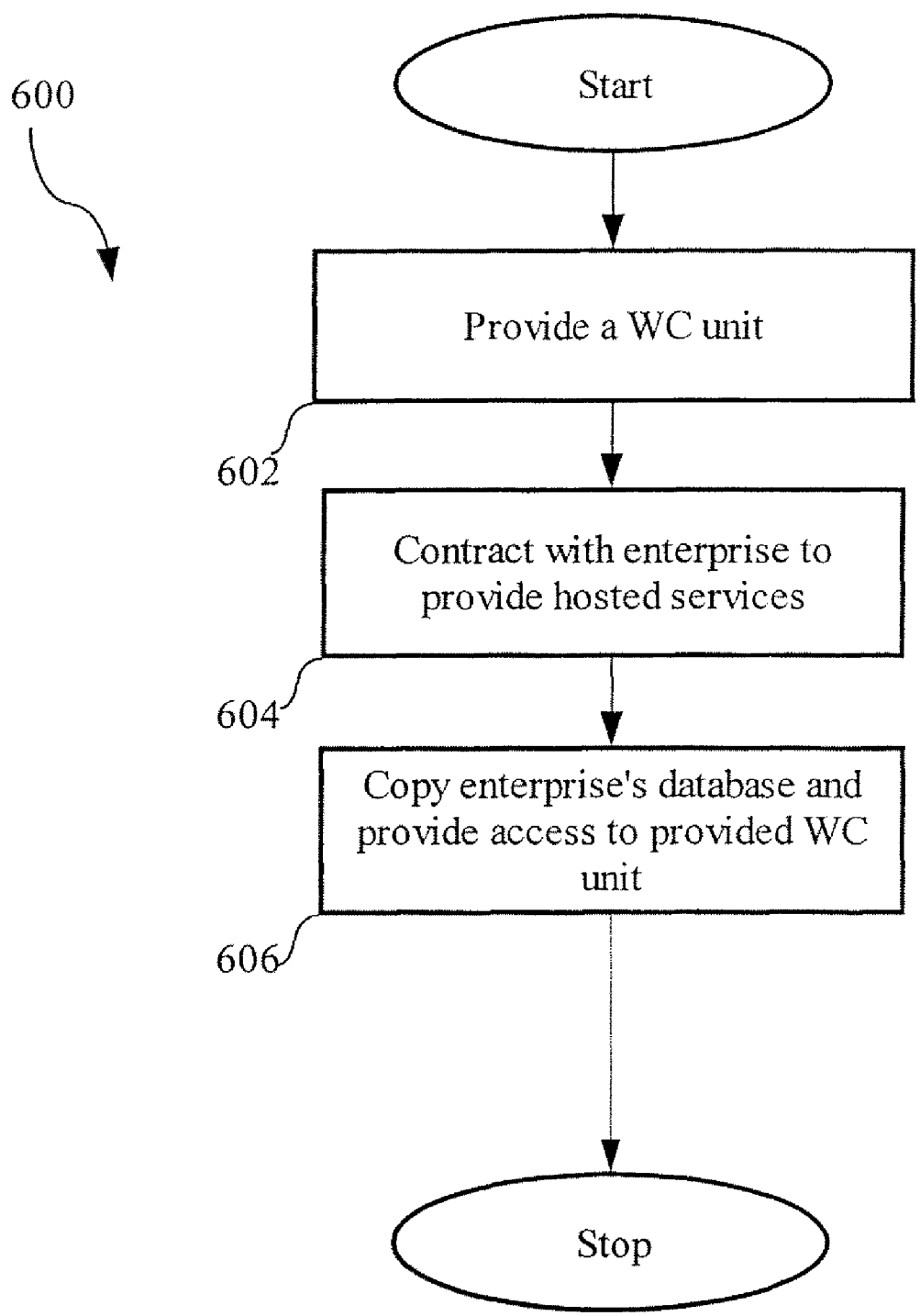
FIG. 10 illustrates in flow chart form exemplary hosted services processing performed in accordance with another embodiment of the invention.

Referring to FIG. 10, a service bureau provides a "hosted serice" 600 to an enterprise by providing a WC unit that is accessible to the enterprise (step 602). It should be appreciated that the service bureau can provide one or many WC units depending upon the amount of enterprises the bureau is supporting. The service bureau enters into a contract with the enterprise (step 604). The parties contract that the service bureau will allow the enterprise to send a copy of its database to the bureau's WC unit at a predetermined periodic interval (e.g., daily, weekly, monthly, etc.) for a predetermined service fee. It should be noted that the service bureau can establish a fee schedule based on the size of the enterprise's database, the frequency of the predetermined periodic interval, or based upon any other business related reason.

Once the enterprise contracts with the bureau, the bureau provides the enterprise with access to its WC unit so that the enterprise can send the bureau its database (step 606). The enterprise will also have the ability to configure user preferences and disaster recovery preferences as described above with reference to FIGS. 1-9. Once the service bureau has a copy of the enterprise's database, disaster recovery processing 450 can be performed as described above with respect to FIG. 7. The lone change is that in step 454, the location A telephone numbers are routed to the WC unit of the service bureau. As such, the mid-size single location enterprise can perform disaster recovery of its telecommunication system 10*a* without having additional hardware such as a dedicated fail-over box (e.g., second WC unit). It should be appreciated that the service bureau can charge an additional fee during the time that the bureau's WC unit is servicing the enterprise's telephone calls (i.e., during the disaster, circuit overload, etc.).

Some single location enterprises, such as small businesses, may not want to own a WC unit at all. These enterprises may be too small to gain all of the advantages of operating a telecommunication system 10*a* described above with respect to FIGS. 1-5. The small-sized enterprise operates a standard PBX network without a WC unit. Despite their size, it is desirable for these small-sized single location enterprises to have the ability to perform disaster recovery in the event that its PBX network becomes inoperable, overloaded, etc. That is, it is desirable for these enterprises to have access to a recovery server (i.e., WC 30) when the need arises.

One way to provide the aforementioned disaster recovery processing to the small-sized single location enterprise is to provide the enterprise with access to a service bureau designed to serve as a WC unit for the enterprise in the event of a disaster. In the event of a disaster, the enterprise has its PBX and DID telephone numbers routed to the service bureau's WC, which then acts as a WC unit for the enterprise. Thus, the small-size single location enterprise have the ability to perform disaster recovery even though it does not have its own WC unit.

Figure 11:
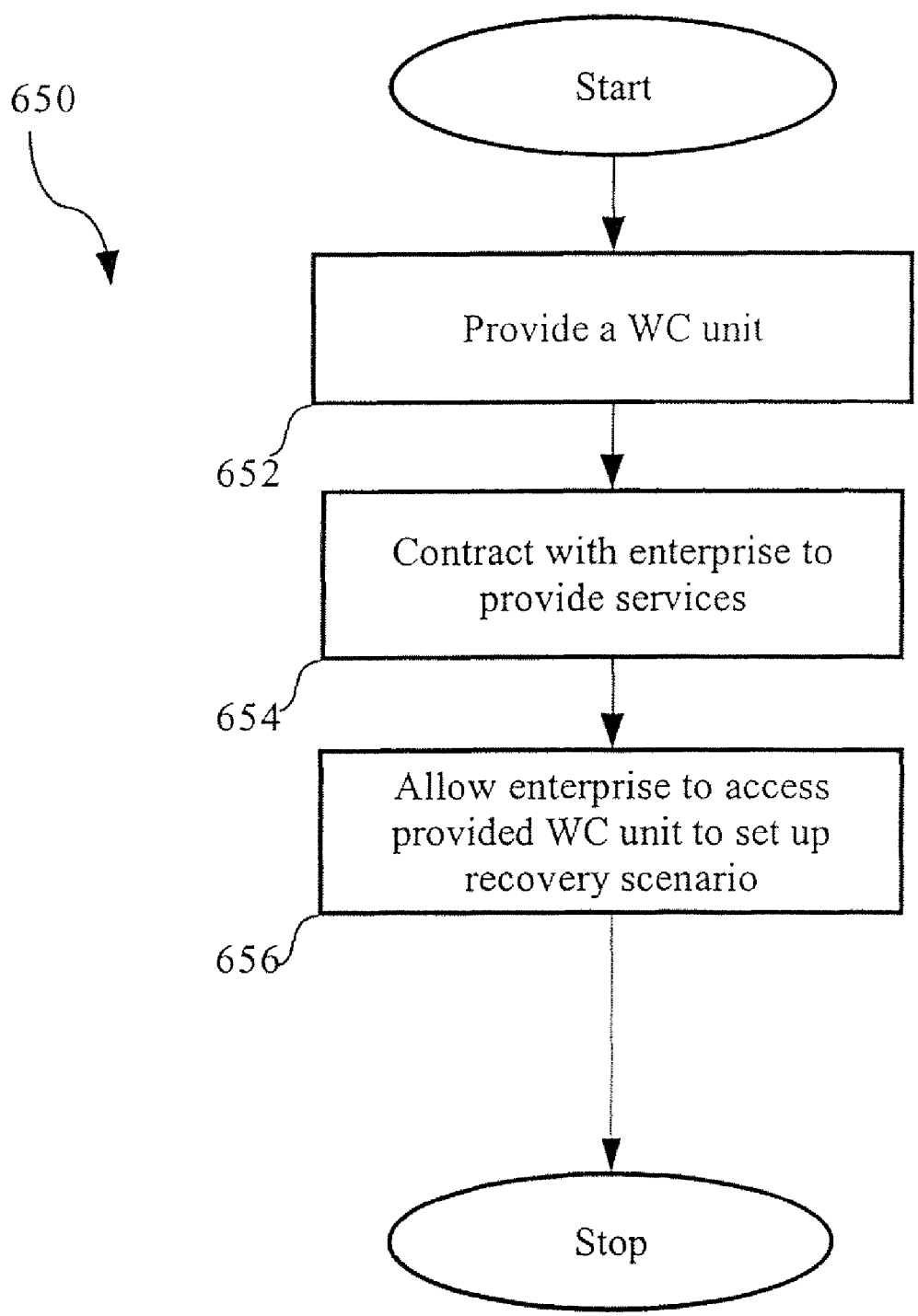
FIG. 11 illustrates in flow chart form exemplary hosted services processing performed in accordance with another embodiment of the invention.

Referring to FIG. 11, a service bureau provides a service 650 to an enterprise by providing a WC unit that is accessible to the enterprise (step 652). It should be appreciated that the service bureau can provide one or many WC units depending upon the amount of enterprises the bureau is supporting. The service bureau enters into a contract with the enterprise (step 654). The parties contract that, for a fee, the service bureau's WC unit will contain a database of telephone numbers for the enterprise in the event that the enterprise's PBX network becomes inoperable. The fee can be a monthly charge or a one time fee for maintaining the database.

Once the enterprise contracts with the bureau, the bureau provides the enterprise with access to its WC unit so that the enterprise can program the bureau's database (step 656). The enterprise will also have the ability to configure user preferences and disaster recovery preferences as described above with reference to FIGS. 1-9. Once the service bureau has a copy of the enterprise's database, disaster recovery processing 450 can be performed as described above with respect to FIG. 7. The lone change is that in step 454, the location A telephone numbers are routed to the WC unit of the service bureau. As such, the small-size single location enterprise can perform disaster recovery of its telecommunication system 10a without having any additional hardware such as a WC unit or dedicated fail-over box. It should be appreciated that the service bureau can charge an additional fee during the time that the bureau's WC unit is servicing the enterprise's telephone calls (i.e., during the disaster, circuit overload, etc.).

Thus, the present invention offers disaster recovery to an enterprise depending upon its size, financial well-being and desired capabilities. For example, the enterprise has the option of owning or renting all of the equipment required so that it may perform disaster recovery on its own and with little outside intervention. The enterprise may own some or none of the necessary equipment and contract with a service bureau so that the bureau provides recovery equipment when needed.

It should be appreciated that the system 400 illustrated in FIG. 6 could also include spare satellite trunks connected to one or both of the telecommunication systems 10a, 10b. This would provide the system 400 with another method for communicating with remote devices associated with the enterprise's network (i.e., satellite telephones). It should also be appreciated that the system 400 (FIG. 6) could utilize "voice over IP" communications (i.e., voice over a data network) with appropriate remote devices. Many of today's wireless telephones have the ability to place and receive cellular and data (voice over IP) telephone calls and to access the Internet or other data network. These conventional remote devices could be used with the system 400.

Figure 12:
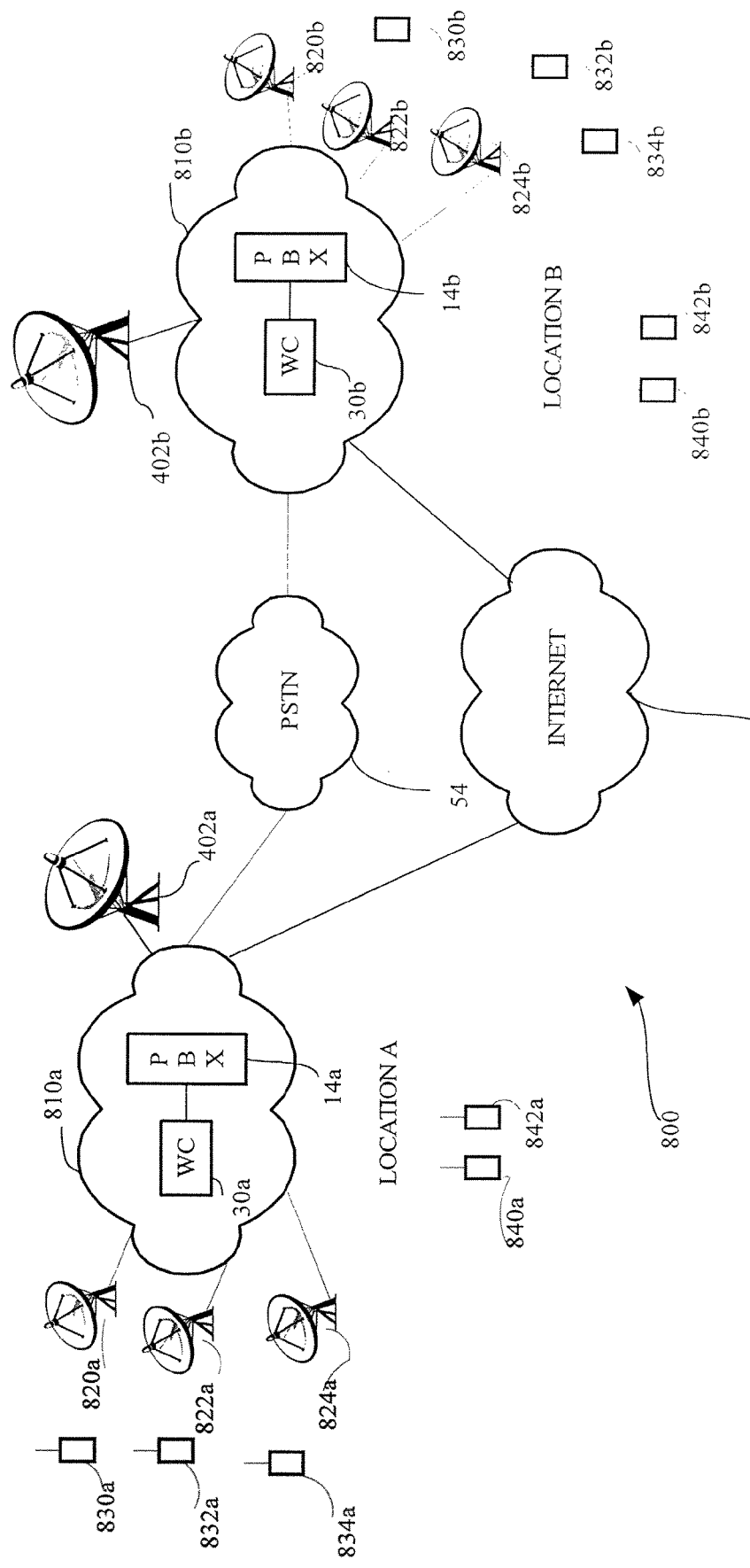
FIG. 12 illustrates an exemplary telecommunication system constructed in accordance with yet another embodiment of the invention.

FIG. 12 illustrates a system 800, that is similar to the system 400 of FIG. 6, with the exception that the illustrated system 800 includes two telecommunication systems 810a, 810b having satellite trunks 820a, 822a, 824a, 820b, 822b, 824b for communicating with satellite remote devices such as satellite telephones 830a, 832a, 834a, 830b, 832b, 834b. The telecommunication systems 810a, 810b are constructed in accordance with the embodiments of the invention described above with reference to FIGS. 1-5, but are also programmed to respectively communicate with the satellite trunks 820a, 822a, 824a, 820b, 822b, 824b when needed. The systems are also programmed to respectively communicate with remote devices 840a, 842a, 840b, 842b using voice over IP or other data network communication technique. Thus, the system 800 allows users of an enterprise network to communicate with cellular, data network, satellite communication and other wireless devices as if these devices where part of a PBX network, even when the enterprise network becomes destroyed or otherwise inoperable.

Figure 13A:
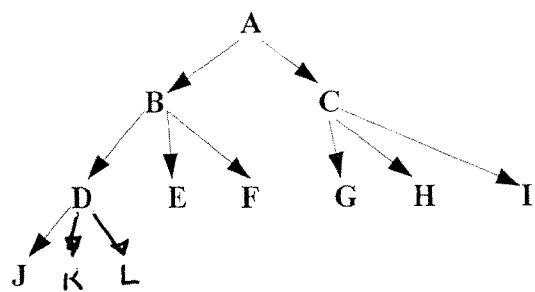
FIGS. 13a and 13b illustrate the conventional calling tree method.

Current methods of determining employee status, whether during an emergency or other enterprise situation, rely on a human calling tree. That is, a high ranking official places a call to immediate subordinates to determine if the subordinates are present, safe, and able to communicate over the existing enterprise network. The subordinates, in turn, each call their respective subordinates and then return their subordinates' status information back up the calling tree. An example of a calling tree is illustrated in FIG. 13a. Employee A calls the employees that report directly to employee A; in this example, employee A calls employees B and C. Employees B and C will then call the employees that report directly to employees B and C, respectively; in this example, employee B calls employees D, E and F while employee C calls employees G, H and I. In the illustrated example, employee D would call employees J, K and L.

Figure 13B:
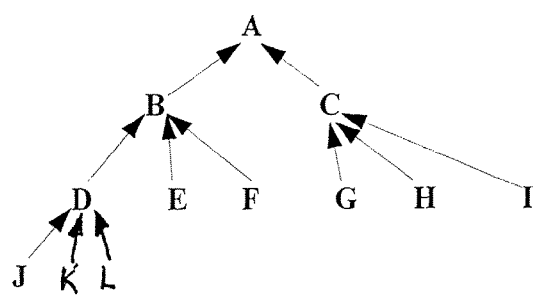

The status of each telephone call would be routed back up through the tree as illustrated in FIG. 13b. That is, employee D reports the status of his calls to employee B. Employee B reports the status he received from employee D and the status of the calls employee B made to employees D, E and F to employee A. Employee A gathers all of the information and makes the best possible assessment of the situation that he possibly can based on this information.

This human calling tree method has several shortcomings. For example, if for some reason employee D is unable to communicate with employee B, the status of employees D, J, K and L will be unknown. Employees J, K, and L may be safe, unharmed, present, etc., but with employee D out of the tree, there may be no easy way to communicate their status up the tree. This problem would be compounded if employees J, K and L were required to place calls and determine the status of other subordinate employees (not shown). Furthermore, since employee A would not receive any status from employees D, J, K and L, employee A could not isolate the problem or resolve the individual status of all of these employees. Moreover, using existing enterprise networks (i.e., network with a WC unit), employee A cannot determine, with out further efforts, whether the employees are injured (i.e., critical situation requiring medical attention) or whether a portion enterprise network is down (i.e., non-critical situation requiring technical attention). In a disaster scenario, the uncertainty could cause more problems such as, for example, dispatching emergency medical personnel to the wrong locations.

The system 400 (FIG. 6), system 800 (FIG. 12), or any other system constructed in accordance with FIGS. 1-12, on the other hand, has the capability of determining the status of all individuals as well as the physical structure and functionality of the enterprise network in an interactive manner. That is, the present invention can use multiple communications methods (e.g., cellular, voice over IP, satellite communications) in order to contact employees. This not only increases the likelihood that the employee can be contacted, but it can also help isolate any problems with the enterprise network (e.g., no cellular service). In addition, the status of the employees and enterprise network can be modified as the situation progresses based on further interaction with the employees and other users of the enterprise network.

Figure 14A:
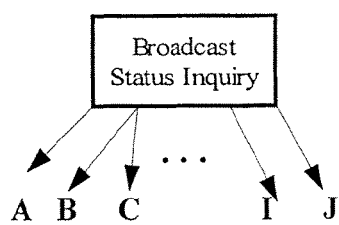
FIGS. 14a and 14b illustrate a roll call method performed in accordance with an embodiment of the invention.
Figure 14B:
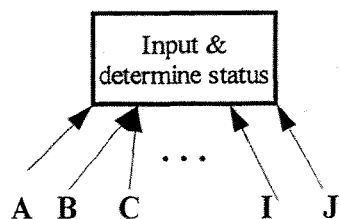

For example, in the event of an emergency, an enterprise network constructed in accordance with the present invention can determine an initial status of its employees by broadcasting a status inquiry message to all employees at the same time. FIG. 14a illustrates an example broadcast of a status inquiry to employees A through L. If the enterprise were using a system 800 (FIG. 12), for example, then the broadcast could be made to the office telephones or the remote devices, either simultaneously or in sequence. Moreover, the broadcast could also be made to all remote devices including cellular, voice over IP, data network, satellite and other wireless devices communicating with the system 800. Once the broadcast is made, the WC unit of the system 800 inputs status information received from the employees as illustrated in FIG. 14b. The WC unit analyzes this information, determines the current status of the employees, and performs additional inquiries if needed. The information obtained could then be used to dispatch medical or technical personnel. These procedures can be fully automated if desired.

In one embodiment, the system of the present invention (e.g., system 800) would broadcast a menu driven status inquiry in which the employees could respond to the inquiry using menu options. The menus could be graphical menus on the remote devices capable of displaying graphical information. Similarly, the menus could be voice activated or DTMF activated for the devices capable of communicating via voice or DTMF signals. The menus could follow the progression of the employee. For example, menu options could seek to determine if the employee is within the enterprise, if the employee needs assistance, if the employee has subsequently left the enterprise, etc. The WC unit can use this information to determine, which employees need assistance if any.

In addition, the WC unit can determine from the responses of the employees which communications methods are operational to determine if there are portions of the physical enterprise network that are still operational or that need repair. If, for example, users in one wing are able to use their office telephones, but users in a second wing are only able to communicate with a remote device, the WC unit can determine that there is a problem in the second wing, but not the first. In the event of a major disaster, one which requires the recovery server, the status information can be used to determine which remote communication method is the best one to use. For example, sometimes during a major disaster cellular coverage may become disrupted. In those situations, the WC unit would elect to communicate with other devices instead of placing calls to the cellular devices.

It should be noted that this capability is not limited to emergency situations. That is, the broadcast status inquiry can be used as a general roll call to determine whether employees are in the office, out sick, on travel, etc. Likewise, the roll call can be used as a periodic routine system maintenance tool to determine if any part of the enterprise network is not working.

Another embodiment of the invention implements priority preemption to any device associated with the WC unit used in the enterprise network. This includes any voice, data and/or satellite devices associated with a telephone number of the enterprise network. This allows priority users to preempt existing communications and communicate with certain individuals even though that individual is using a wireless telephone or other remote device. To implement this priority preemption feature, the WC unit must be programmed to recognize a special dialing pattern, data message or other input from one of the many devices that the high priority user may be using. This unique pattern whether it is a dialing pattern, data message or other input is referred to herein as the preemption signal. The priority preemption signal proceeds a telephone number in which the high priority user wishes to call. If the individual associated with the telephone number is already on another call, then the priority preemption may be invoked as follows.

Figure 15:
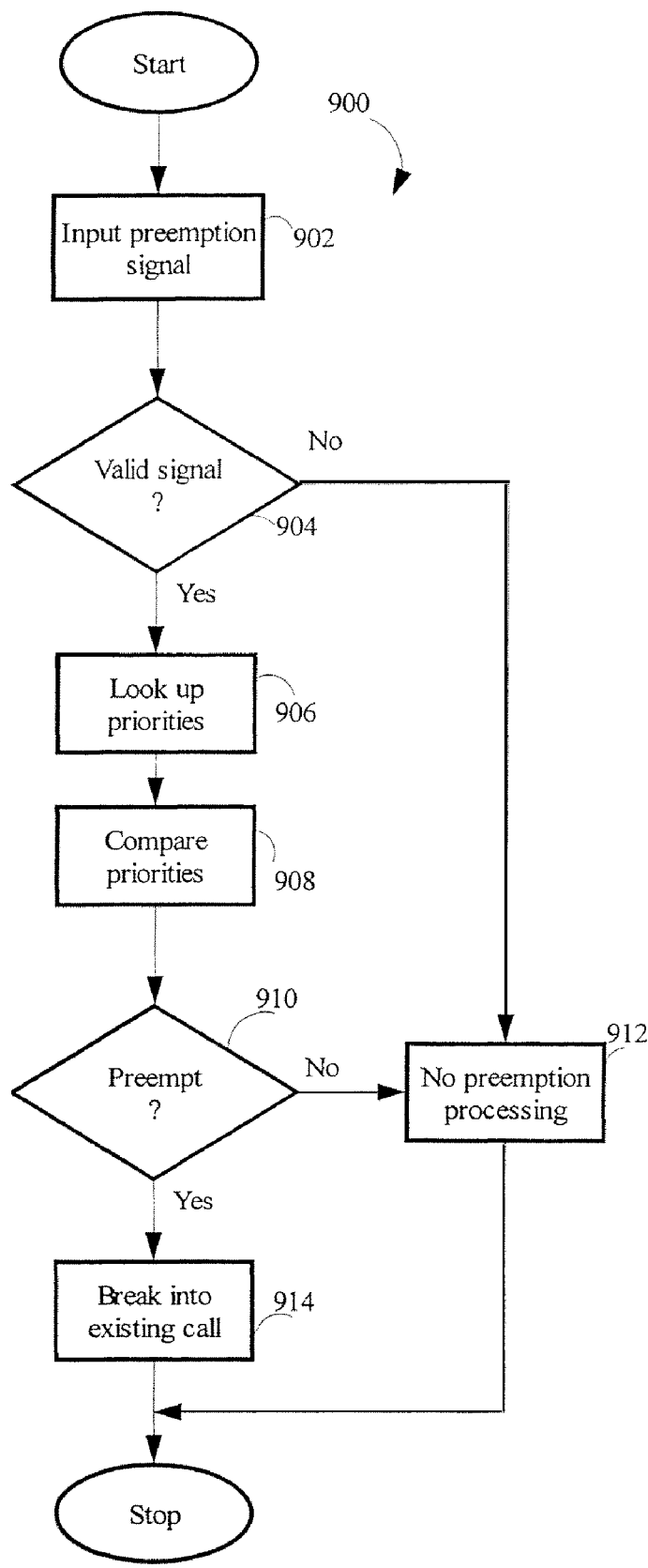
FIG. 15 illustrates exemplary priority preemption processing performed by an embodiment of the invention.

FIG. 15 illustrates exemplary priority preemption processing 900 performed by an embodiment of the invention. The processing 900 begins when the WC unit detects a preemption signal and a dialed telephone number (step 902). The WC unit checks the preemption signal to determine if it is a valid signal (step 904). If valid, the WC unit uses the signal to determine the priority of the caller, the individual associated with the dialed telephone number, and if possible, the priority of the individual on the active call (step 906). The WC unit compares the priorities to determine if the person attempting to preempt the call has the highest priority (step 910) and if so, breaks into the office telephone call, remote voice call, data session, satellite communication as applicable (step 914). Due to the flexibility of the WC unit, priority preemption may be implemented using DTMF, IVR, web based or microbrowser communications.

If the person attempting to preempt the call does not have the highest priority (step 910) or if the preemption signal is invalid (step 904), then additional call processing may be performed (step 912). This additional processing may be a prompt, voice or text message or other alert to the caller to indicate that the preemption cannot occur at this time. The processing may also include a menu of options in which the caller can choose to leave a message, try again, or merely hang up. It should be appreciated that priority preemption may be implemented in any manner desired by the enterprise and that the invention is not limited to the specific steps illustrated in FIG. 15.

Wireless data networks, such as the 80211 wireless LAN, are becoming increasingly popular these days. Airport lounges, Internet cafes and other establishments offer the ability for users with data devices and/or voice over IP devices to hook into its wireless data networks. This allows users to place a voice over IP call using the establishments wireless data network. Some cellular devices are equipped, or may be equipped, with a device that can handle wireless data communications. Likewise, some wireless data devices may become equipped with a device or circuit for handling cellular communications. It is clear that the present invention allows for wireless cellular communications as well as wireless data communications with such devices.

In some situations, a user on a wireless cellular call may enter an establishment with a wireless LAN. It would be desirable for that cellular call to be switched to a voice over IP call using the enterprises' wireless LAN. This could reduce the cost of the call to the user. Similarly, if the user was on a data call and exits the range of the wireless LAN, it is desirable to have that data call switched over to a cellular call. Currently, there is no technique for switching a cellular call to a data call or to switch a data call to a cellular call. The present invention on the other hand has such a capability.

For example, an inbound call to an office extension can be routed to a user's remote device (as discussed above with respect to FIGS. 1-5). Presuming that the remote device has cellular communications ability and the user's preferences are set such that the call can be routed to the remote device, the inbound call is routed to the cellular device via a cellular telephone call. If during the duration of this call the user enters a room, establishment or other area having a wireless data network (e.g., 80211 wireless LAN), the invention can switch that call over to a data device (or if the user's remote device has a data capability, the call may be switched to the data capability of the user's remote device).

Figure 16:
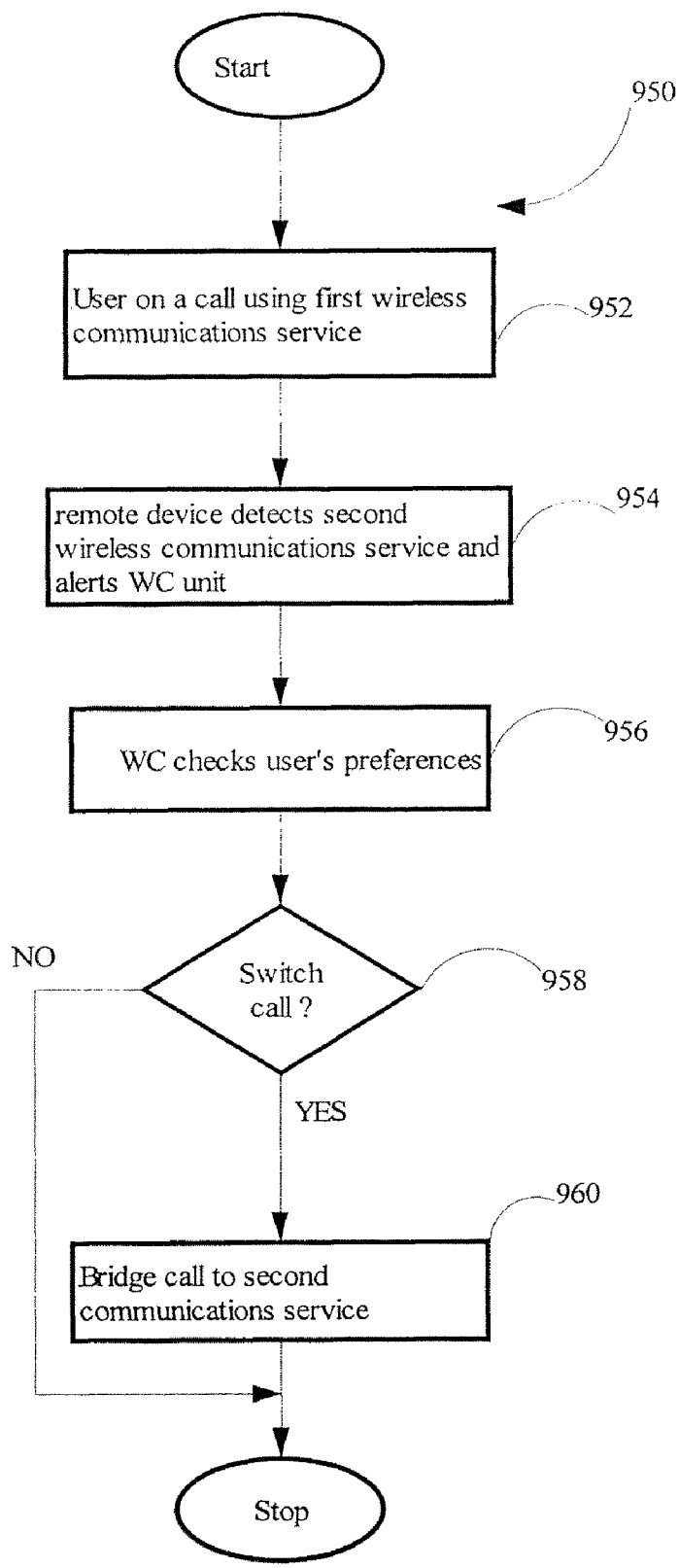
FIG. 16 illustrates exemplary seamless switching processing performed by an embodiment of the invention.

This seamless switching between cellular and data communications is performed as follows. Referring to FIG. 16, the processing 950 begins when a user's remote device is connected to a first wireless communications service (e.g., cellular) by a WC unit in accordance with FIGS. 1-5 (step 952). At some point, one of the user's remote devices (or the same remote device) detects that a second communications service is available. This remote device alerts the WC unit that a second communications service is available (step 954). The WC unit receives this alert and uses its databases to retrieve the user's preferences (step 956). The WC checks the preferences to see if it can switch the call to the remote device communicating with the second communications service (step 958). If the preferences allow the switch, the WC unit bridges the call to the second communication service (either to a new device or to the same device if it has the capability) (step 960). If the preferences do not allow the switch, the WC unit does not bridge the call.

It should be noted, that the processing can also take into account other factors when determining if there should be a switch over to the second service. For example, the WC unit may consider Quality of Service (QoS) information typically available from today's wireless service providers. That is, if the first communications has a better QoS, the WC unit can decide not to make the switch unless the user has a different preference. Similarly, the WC unit can make a switch to a device with the better QoS if so desired.

It should be noted that a data service such as a voice over IP call can be switched to a circuit or cellular device (or the cellular portion of the same remote device) once the user exits the range of the wireless data network. It should be noted that the foregoing processing can switch between different physical devices or between the data and cellular capability of the same device. That is, the type of remote wireless device does not limit the invention. All that is required is for the user's remote device(s) to be associated with a telephone number registered with the WC unit of the invention.

In a preferred embodiment, WC 30 is co-located with the enterprises' PBX 14, but may also be centrally located in a remote location or distributed among the many locations, or any combination of these arrangements. Similarly, any WC 30 serving as a recovery server may be co-located with a PBX of the enterprise or service bureau, telephone company switch or wireless provider switch.

While preferred embodiments have been specifically described and illustrated herein, it should be apparent that many modifications to the embodiments and implementations of the invention can be made without departing from the spirit or scope of the invention. For example, while the preferred embodiments illustrated herein have been limited to the processing of voice (packet or circuit switched) calls, it should be readily apparent that any form of call (e.g., audio, video, data) may be processed through WC 30 to any communication device (e.g., cellular phone, pager, office/residential landline telephone, computer terminal, personal digital assistant (PDA), RIM device, etc.). The individual method steps of the exemplary operational flows illustrated in FIGS. 3-5, 7-11 and 15-16 may be interchanged in order, combined, replaced or even added to without departing from the scope of the invention. Any number of different operations not illustrated herein may be performed utilizing the invention. Moreover, the method steps may be performed by hardware, software, firmware or any combinations of hardware, software, firmware or logic elements.

In addition, while the illustrated embodiments have demonstrated implementations of the invention using PBX-based communication systems, it should be readily apparent that the WC module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the present invention does not need a PBX to operate or to perform any of the processing illustrated in FIGS. 3-5, 7-11 and 15-16. All that the invention requires is a properly programmed wireless connection unit.

It should be apparent that, while only PRI lines (e.g., between PBX 14 and WC 30, between PBX 14 and PSTN 16) have been illustrated in discussing preferred embodiments of the invention, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in reducing the invention to practice. It should be noted that the WC 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint PCS and Nextel, etc.) depending on the communication devices registered with the system.

The modules described herein such as the modules making up WC 30, as well as WC 30 and PBX 14 themselves, may be one or more hardware, software, or hybrid components residing in (or distributed among) one or more local or remote systems. It should be readily apparent that the modules may be combined (e.g., WC 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with WC 30 may be any device used to input and/or output information. The interface devices may be implemented as a graphical user interface (GUI) containing a display or the like, or may be a link to other user input/output devices known in the art.

One counter terrorism aspect of the invention involves the ability of masking the location of a telephone user. For example, a person may call an agent of the Federal Bureau of Investigation (FBI) at his office number. The FBI agent may pick up the call on his satellite or cellular phone. The transfer of the telephone call is accomplished seamless, and so the caller is unaware of the actual location of the FBI agent, allowing the FBI agent greater freedom of movement. Further, the FBI agent may initiate a telephone call from his cellular or satellite telephone but spoof the calling location. This may be accomplished by entering an alternative caller identification number in the GUI, thus masking the true caller identification. Both of these abilities may be useful in protecting undercover agents involved in various interdiction activities, such as counter terrorism.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components. Accordingly, the invention is not to be seen as limited by the foregoing description, but is only limited by the scope of the appended claims.

What is claimed as new and desired to be protected by Letters Patent of the United States is:

1. A method of switching a telephone call from a circuit-switched communication network to a data packet communication network, the method comprising:
    receiving, at a wireless connect unit, an incoming call for a user at a telephone extension of the circuit-switched communication network;
    retrieving from a storage medium a mobile telephone number for a wireless device associated with the telephone extension;
    routing the incoming call to the wireless device;
    receiving from the wireless device a signal indicative that the wireless device can handle the call on the data packet communication network; and
    bridging the call to the data packet communication network when the wireless connect unit determines that the call should be switched to the data packet communication network based on user preferences associated with the telephone extension of the circuit-switched communication network.

2. The method of claim 1, wherein said bridging comprises bridging when the wireless connect unit determines that a quality of service would be improved by switching the call to the data packet communication network.

3. The method of claim 1, further comprising bridging the call back to the circuit-switched communication network when it is determined that the telephone call should be switched back to the circuit-switched communication network.

4. The method of claim 1, further comprising routing the call to a second wireless device when bridging the call.

5. The method of claim 1, wherein the wireless connect unit is co-located with the circuit-switched communication network.

6. The method of claim 1, wherein the wireless connect unit is remotely located with respect to the circuit-switched communication network.

7. The method of claim 1, wherein said bridging is performed through a Public Switched Telephone Network.

8. A telecommunication device operatively connected between a circuit-switched communication network and a data packet communication network, comprising:
    a storage medium comprising user profiles associate with telephone extensions of the circuit-switched communication network, each profile associated at least one wireless device and user preferences to one of the telephone extensions;
    a processor in communication with the storage medium, the processor for:
        receiving an incoming call for a user at one of the telephone extensions of the circuit-switched communication network;
        retrieving from the storage medium a mobile telephone number for the at least one wireless device associated therewith;
        routing the incoming call to the at least one wireless device;
        receiving from the at least one wireless device a signal indicative that the at least one wireless device can handle the call on the data packet communication network; and
        bridging the call to the data packet communication network when the wireless connect unit determines that the call should be switched to the data packet communication network based on user preferences associated with the telephone extension of the circuit-switched communication network.

9. The telecommunication device of claim 8, wherein the processor is further adapted to bridge the call when the wireless connect unit determines that a quality of service would be improved by switching the call to the data packet communication network.

10. The telecommunication device of claim 8, wherein the processor is further adapted to bridge the call back to the circuit-switched communication network when it is determined that the telephone call should be switched back to the circuit-switched communication network.

11. The telecommunication device of claim 8, wherein the processor is further adapted for routing the call to a second wireless device when bridging the call.

12. The telecommunication device of claim 8, wherein the telecommunication device is co-located with the circuit-switched communication network.

13. The telecommunication device of claim 8, wherein the telecommunication device is remotely located with respect to the circuit-switched communication network.

14. The telecommunication device of claim 8, wherein said bridging is performed through a Public Switched Telephone Network.

* * * * *